United States Patent [19]
Nagura

[11] Patent Number: 5,296,926
[45] Date of Patent: Mar. 22, 1994

[54] IMAGE DATA TRANSMISSION SYSTEM CAPABLE OF OBTAINING A HIGH RESOLUTION STEREO IMAGE WITH REDUCED TRANSMISSION DATA

[75] Inventor: Riichi Nagura, Tokyo, Japan

[73] Assignee: NEC Corporation, Japan

[21] Appl. No.: 978,995

[22] Filed: Nov. 19, 1992

[30] Foreign Application Priority Data

Nov. 19, 1991 [JP] Japan .................. 3-303641
Nov. 19, 1991 [JP] Japan .................. 3-303642

[51] Int. Cl.$^5$ ............................. H04N 7/18
[52] U.S. Cl. ...................... 348/144; 348/43
[58] Field of Search .................. 358/109, 88

[56] References Cited

U.S. PATENT DOCUMENTS

| | | | |
|---|---|---|---|
| 4,364,085 | 12/1982 | Dalke | 358/109 |
| 4,686,474 | 8/1987 | Olsen et al. | 358/109 |
| 4,688,091 | 8/1987 | Kamel et al. | 358/109 |
| 4,688,092 | 8/1987 | Kamel et al. | 358/109 |
| 4,689,748 | 8/1987 | Hofmann | 358/109 |
| 4,746,976 | 5/1988 | Kamel et al. | 358/109 |
| 4,814,607 | 3/1989 | Hofmann | 358/109 |
| 4,814,711 | 3/1989 | Olsen et al. | 358/109 |
| 4,951,136 | 8/1990 | Drescher et al. | 358/109 |
| 5,027,199 | 6/1991 | Suzuki | 358/88 |
| 5,134,473 | 7/1992 | Nagura | 358/109 |

FOREIGN PATENT DOCUMENTS

2040061A1 12/1986 European Pat. Off.
451837A2 10/1991 European Pat. Off.

*Primary Examiner*—Tommy P. Chin
*Assistant Examiner*—Vu Le
*Attorney, Agent, or Firm*—Ostrolenk, Faber, Gerb & Soffen

[57] ABSTRACT

In an image data transmission system which is for transmitting an image data signal from a craft flying over an object zone to an earth station and which comprises a first (photoelectric) transducer (34a) for producing a first partial (electric) signal representative of a partial zone when the craft is at a first position and a second transducer (34b) for producing a second partial signal representative of the partial zone when the craft is, a first duration later, at a second position spaced apart from the first position by a first distance, a delay circuit (36-1) produces a delayed signal having a delay equal to the first duration relative to the first partial signal. A time difference detecting circuit (36-2) detects a time difference between the delayed signal and the second partial signal and produces a time difference signal. A transmission processing circuit (36-3) processes the delayed signal by the use of the time difference signal and produces a processed signal. A level difference detecting circuit (36-4) detects a level difference between the processed signal and the second partial signal and produces a level difference signal. A transmitting unit (37) transmits the delayed signal, the time difference signal, and the level difference signal collectively as the image data signal to the earth station. It is possible to reduce data quantity of the time difference signal and the level difference signal to at least one-tenth relative to that of the second partial signal.

25 Claims, 14 Drawing Sheets

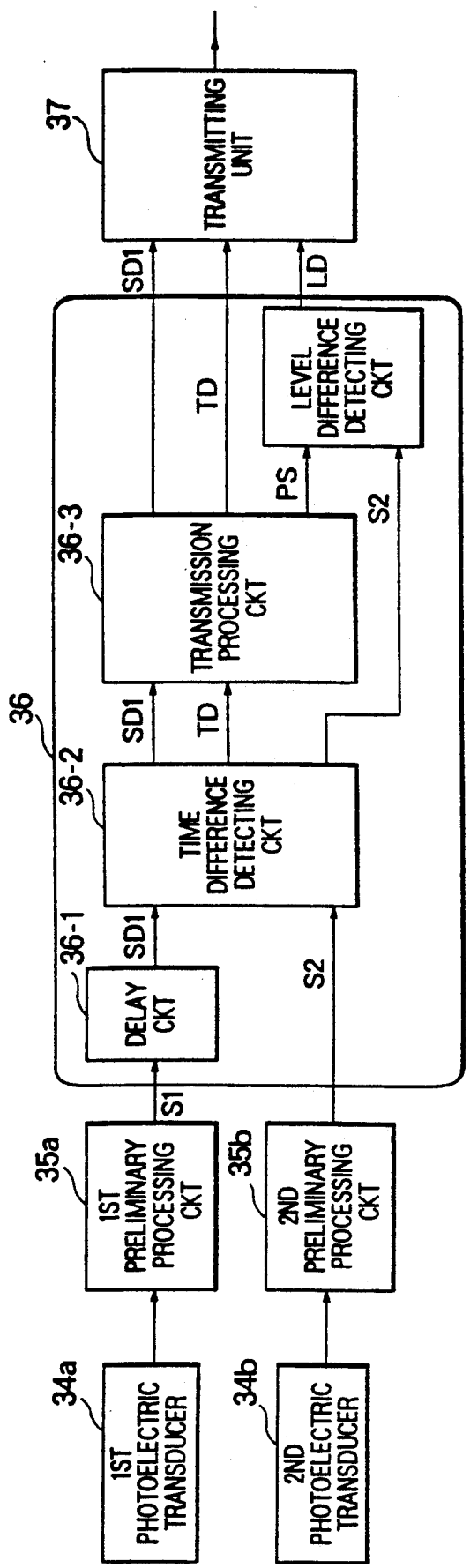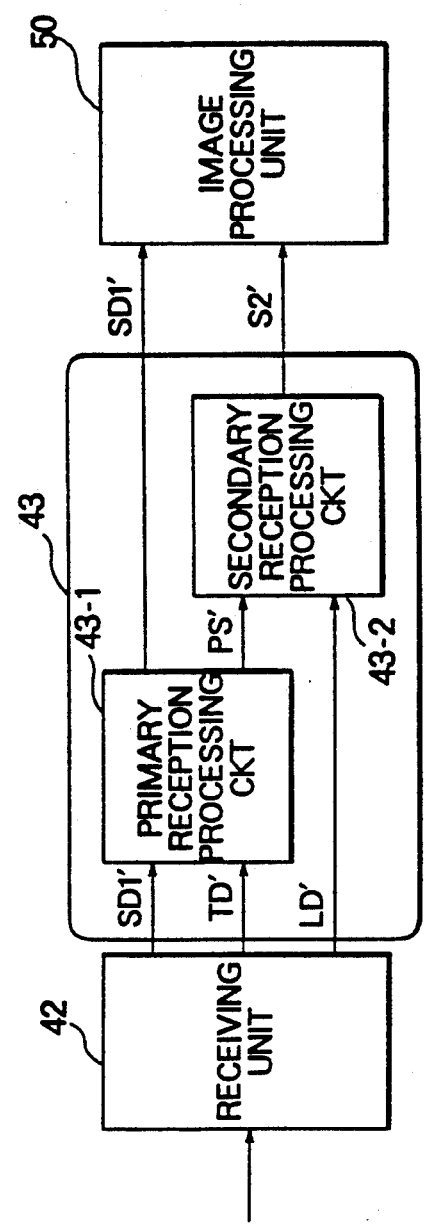
FIG. 2(a)
FIG. 2(b)

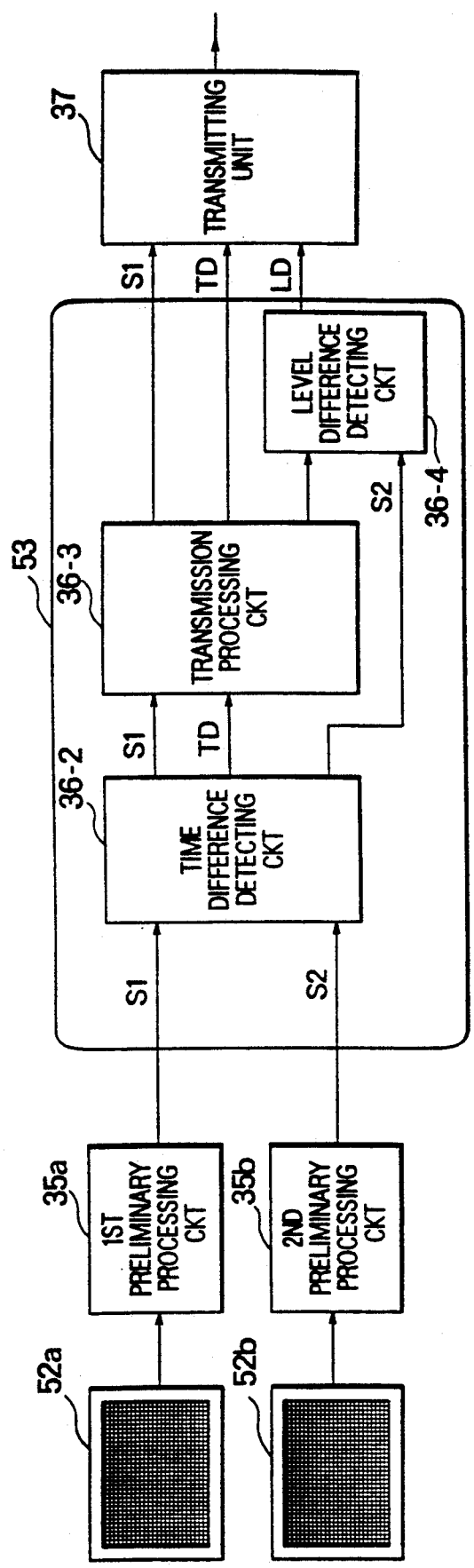
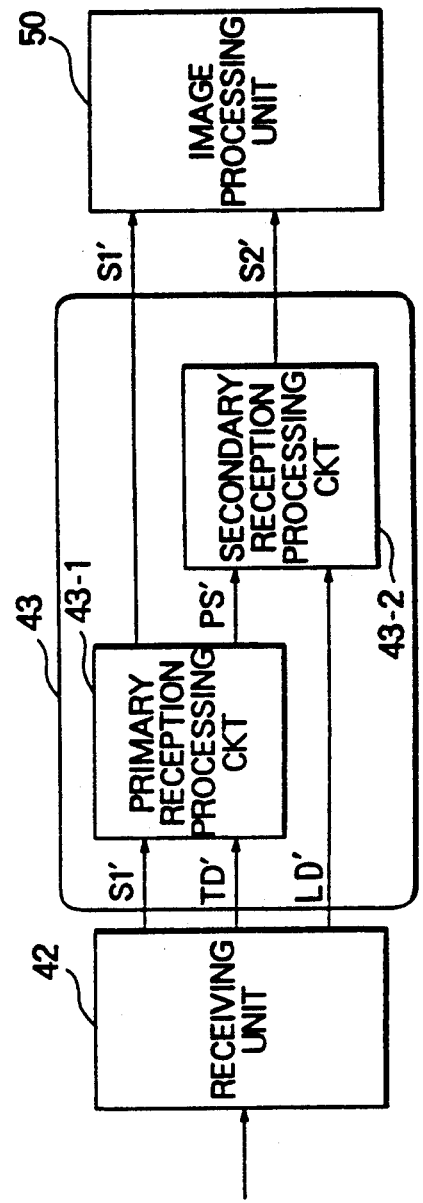
FIG. 6(a)
FIG. 6(b)

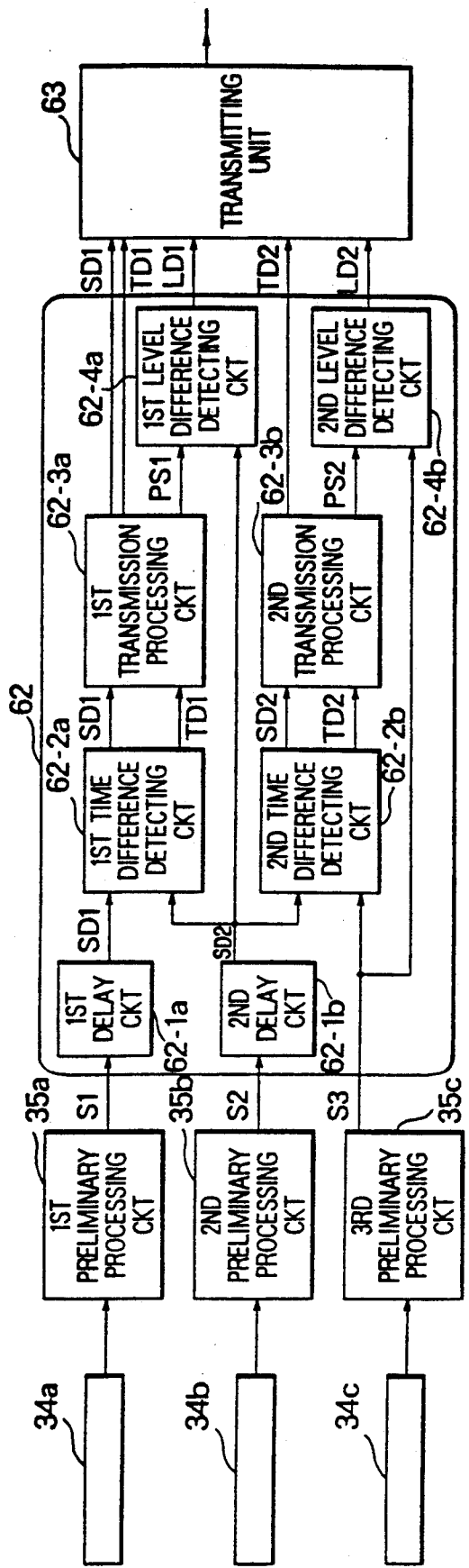
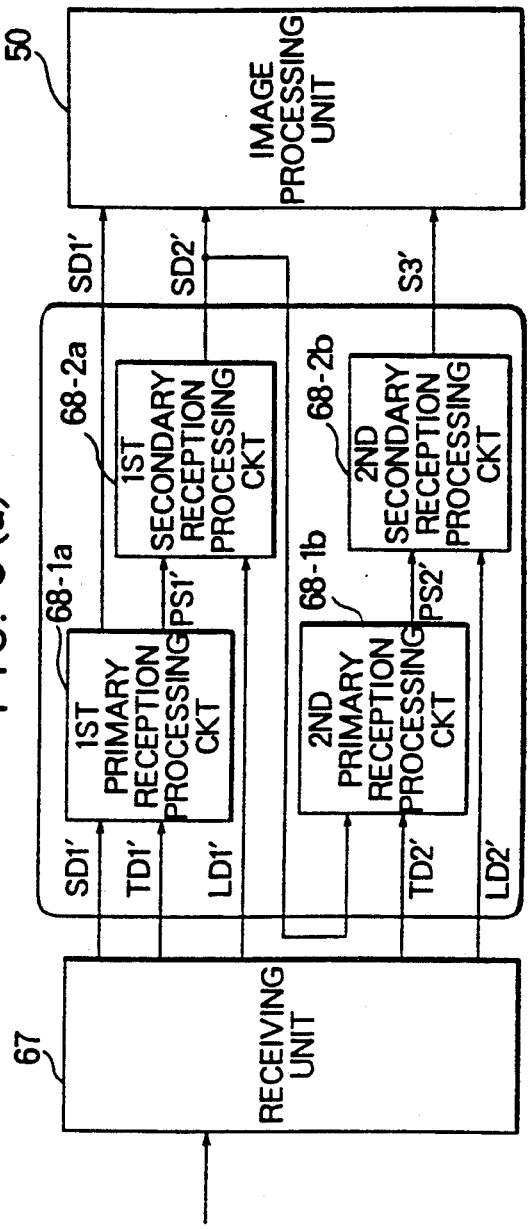
FIG. 8 (a)
FIG. 8 (b)

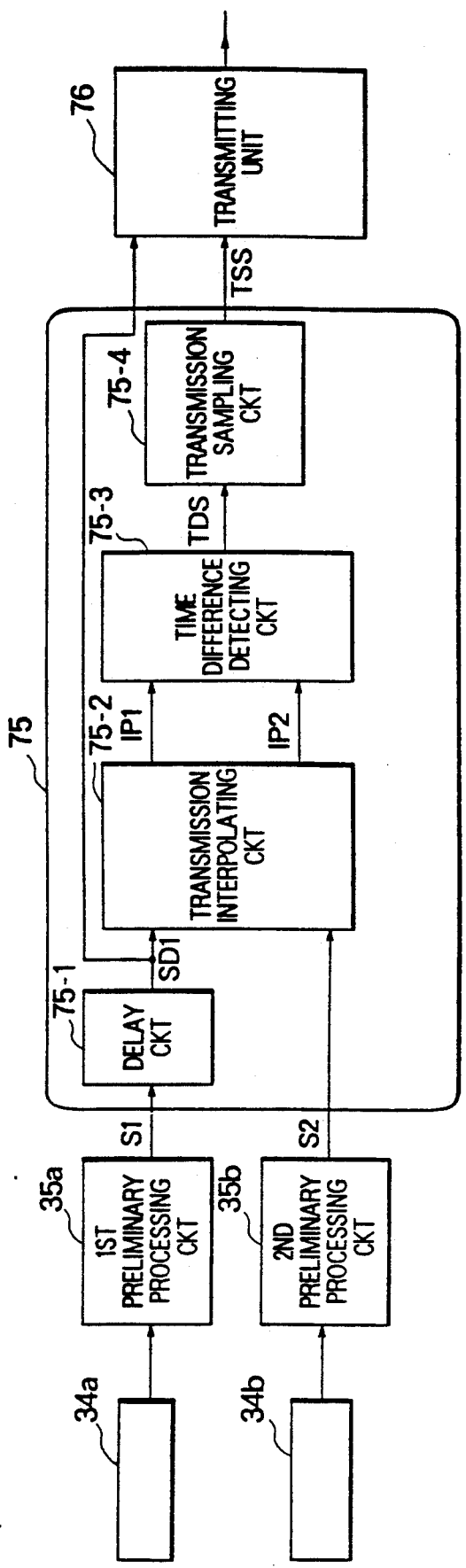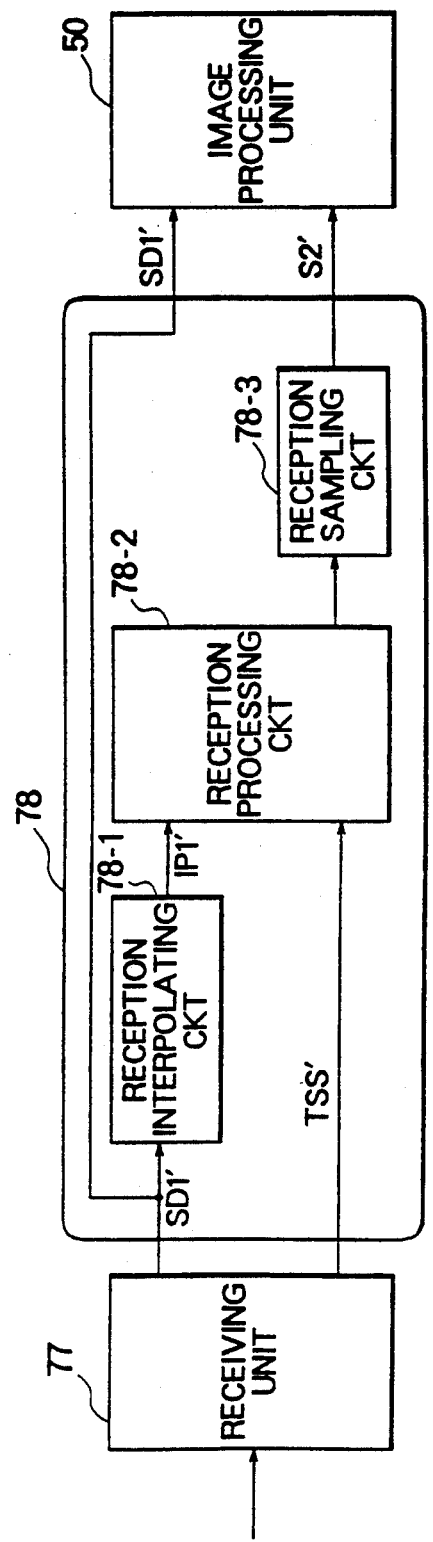
FIG. 10 (a)
FIG. 10 (b)

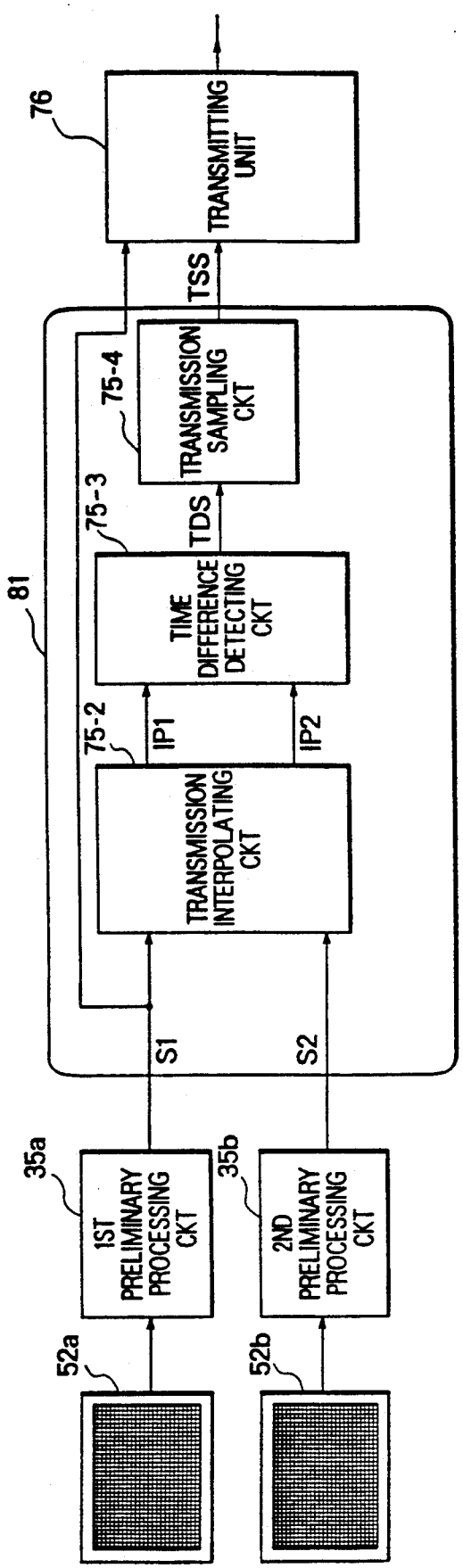
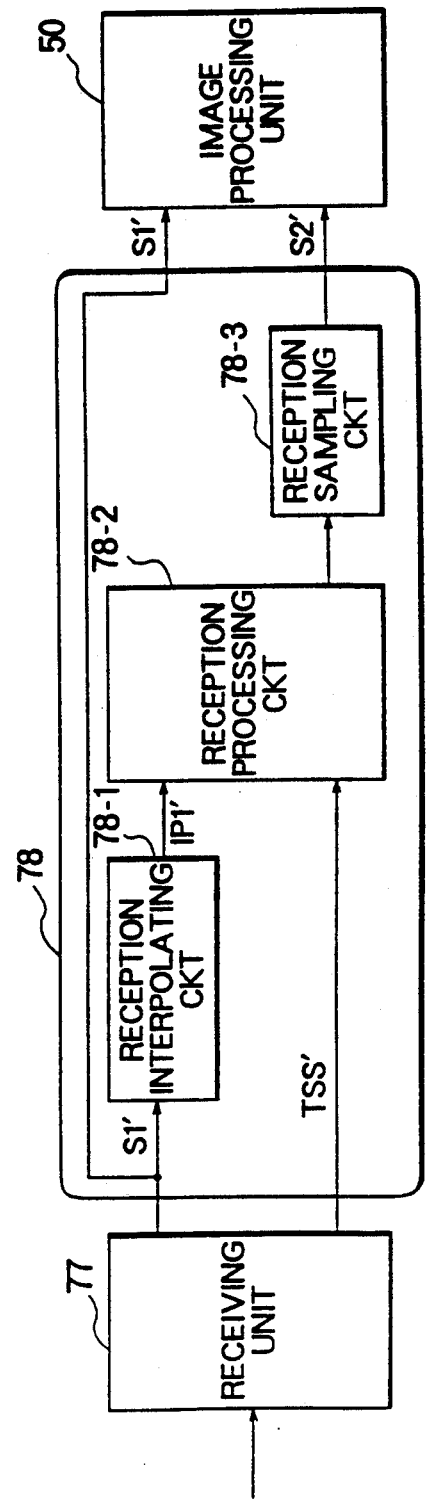
FIG. 12 (a)
FIG. 12 (b)

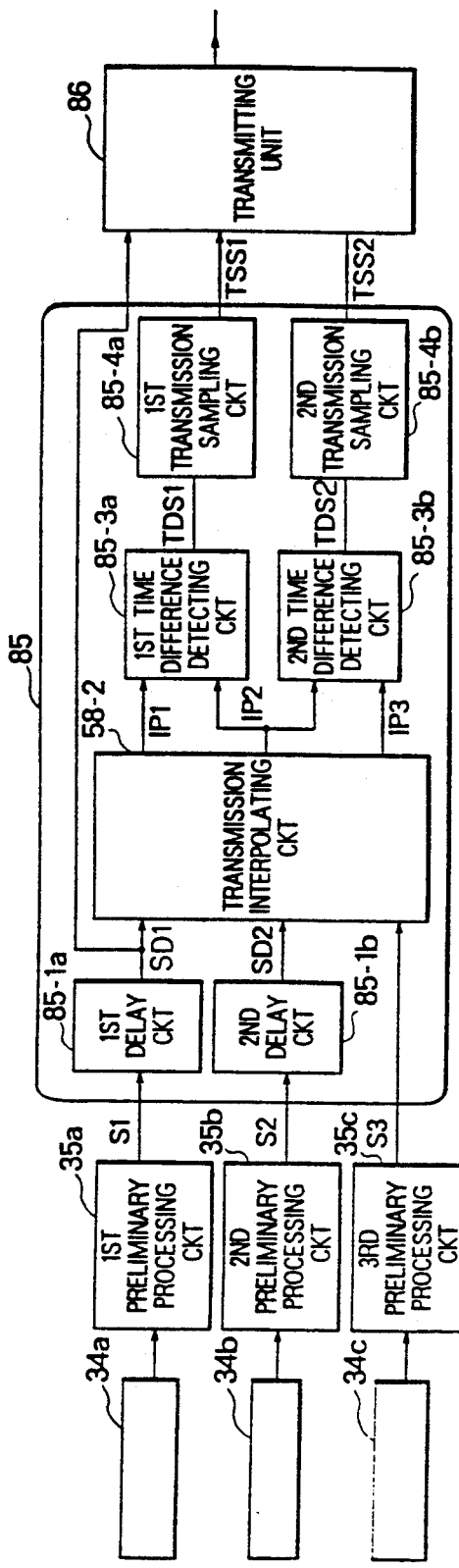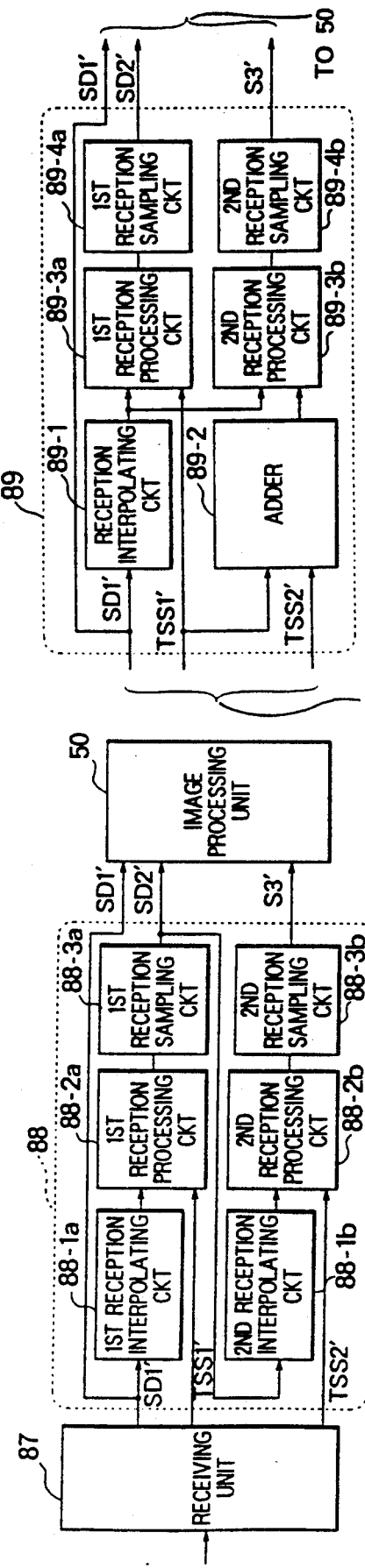
FIG. 13(a)
FIG. 13(b)
FIG. 13(c)

IMAGE DATA TRANSMISSION SYSTEM CAPABLE OF OBTAINING A HIGH RESOLUTION STEREO IMAGE WITH REDUCED TRANSMISSION DATA

BACKGROUND OF THE INVENTION

This invention relates to an image data transmission system for transmitting an image data signal from a craft, such as a spacecraft, to an earth station in order to obtain a stereo image of an object zone which is typically on the ground surface. Such an image data transmission system is particularly useful in a remote sensing system for a planet, such as the earth.

An image data transmission system of the type described is used to remotely sense an object zone on board a craft flying over the object zone along a flying direction at a predetermined flight altitude. In a remote sensing system, it is often necessary to pick up a stereo image, such as a stereo topographic image, from the object zone by the use of an image pickup apparatus. In order to provide the stereo image, the object zone should be picked up, along the flying direction at two positions spaced apart from each other, so as to form two optical images of the object zone. As will become clear, the craft carries the image pickup apparatus comprising an optical system for producing first and second partial optical images of first and second partial zones of the object zone, which are spaced apart from each other. The image data transmission system comprises first and second photoelectric transducers for transducing the first and the second partial optical images to first and second partial electric signals, respectively. The first and the second partial electric signals are transmitted, as an image data signal, by a transmitter from the craft to an earth station.

A recent requirement is to provide the stereo topographic or a like image at a high resolution so as to make up a precise stereo topography or the like. This requirement gives rise to an increase of data quantity of the image data signal. However, the craft has a restricted data transmission rate. This means that it is necessary to carry out data compression of the first and the second partial electric signals.

A conventional image data transmission system by the use of the data compression is disclosed in U.S. Pat. No. 5,134,473 issued to Riichi Nagura, namely, the instant applicant, and assigned to the instant assignee. In brief, the image data transmission system comprises the first photoelectric transducer for producing the first partial electric signal representative of the first partial optical image of the first partial zone lying forwardly of the craft flying at a first position and the second photoelectric transducer for producing the second partial electric signal representative of the second partial optical image of the second partial zone lying directly under the craft flying, an interval of time later, at a second position spaced apart from the first position by a distance between the first and the second partial zones picked up by the first and the second photoelectric transducers when the craft is at the first position. The image data transmission system further comprises a compression unit for compressing the first and the second partial electric signals into first and second compressed signals. A delay circuits gives the first compressed signal a delay equal to the interval of time and produces a delayed signal. A subtracter calculates a difference between the delayed signal and the second compressed signal and produces a difference signal. The first compressed signal and the difference signal are transmitted by a transmitter, as the image data signal, to the earth station to obtain the stereo image of the object zone.

In the data transmission system described above, it is inevitable that the stereo image has restricted quality.

SUMMARY OF THE INVENTION

It is therefore an object of this invention to provide an image data transmission system capable of obtaining a high resolution stereo image with reduced transmission data.

Other object of this invention will become clear as the description proceeds.

On describing the gist of this invention, it is possible to understand that an image data transmission system is for transmitting an image data signal from a craft to an earth station. The craft flies over an object zone in a predetermined direction and comprises an optical system for producing first and second partial optical images of first and second partial zones of the object zone, which are picked up by first and second pickup angles, respectively. The first partial zone is spaced apart from the second partial zone by a first distance forwardly of the predetermined direction. The image data transmission system comprises first and second photoelectric transducers consisting of a plurality of photoelectric transducing elements lying transversely of the predetermined direction for transducing the first and the second partial optical images to first and second partial electric signals representative of the first and the second partial zones, respectively. Each of the first and the second partial electric signals comprises a succession of picture element signals which are in one-to-one correspondence to the plurality of photoelectric transducing elements and which have picture element signal levels. The craft flies for a first duration from a first position to a second position spaced apart from the first position by the first distance.

According to an aspect of this invention, the image data transmission system further comprises a transmission signal processing means comprising:(a) a delay circuit supplied with the first partial electric signal for giving the first partial electric signal a first delay equal to the first duration to produce a delayed signal having the first delay relative to the first partial electric signal; (b) a time difference detecting circuit supplied with the second partial electric signal and connected to the delay circuit for detecting a time difference between the second partial electric signal and the delayed signal in each of the picture element signals, the time difference detecting circuit producing a time difference signal representative of the time difference; (c) a transmission processing circuit connected to the time difference detecting circuit for processing the delayed signal by subtracting the time difference from the delayed signal in each of the picture element signals, the processing circuit producing a processed signal having a waveform approximate to that of the second partial electric signal; (d) a level difference detecting circuit connected to the time difference detecting circuit and the transmission processing circuit for detecting a level difference between the second partial electric signal and the processed signal in each of the picture element signals, the level difference detecting circuit producing a level difference signal representative of the level difference; and (e) a multiplexer supplied with the delayed signal and connected to the transmission processing circuit and the level difference detecting circuit for multiplexing the delayed signal, the time difference signal, and the level difference signal into a multiplexed signal to transmit the multiplexed signal to the earth station as the image data signal.

The earth station receives the image data signal as a reception image data signal and comprises: (A) a demultiplexer for demultiplexing the reception image data signal into a demultiplexed delayed signal as a reproduction of the delayed signal, a demultiplexed time difference signal, and a demultiplexed level difference signal; (B) a primary reception processing circuit connected to the demultiplexer and supplied with the demultiplexed delayed signal and the demultiplexed time difference signal for processing the demultiplexed delayed signal in accordance with the demultiplexed time difference signal to produce a primary processed signal as a reproduction of the processed signal; and (C) a secondary reception processing circuit connected to the demultiplexer and the primary reception processing circuit for processing the primary processed signal in accordance with the demultiplexed level difference signal to produce a secondary processed signal is a reproduction of the second partial electric signal.

BRIEF DESCRIPTION OF THE DRAWING

FIG. 2 is a block diagram of the craft and the earth station which are illustrated in FIG. 1;

FIG. 6 is a block diagram of an earth station and the craft illustrated in FIG. 1;

FIG. 8 is a block diagram of the craft and the earth station which are illustrated in FIG. 7;

FIG. 10 is a block diagram of a craft and an earth station according to a fourth embodiment of this invention;

FIG. 12 is a block diagram of a craft and an earth station according to a fifth embodiment of this invention;

FIG. 13 is a block diagram of a craft and an earth station according to a sixth embodiment of this invention.

DESCRIPTION OF THE PREFERRED EMBODIMENT

Figure 1:
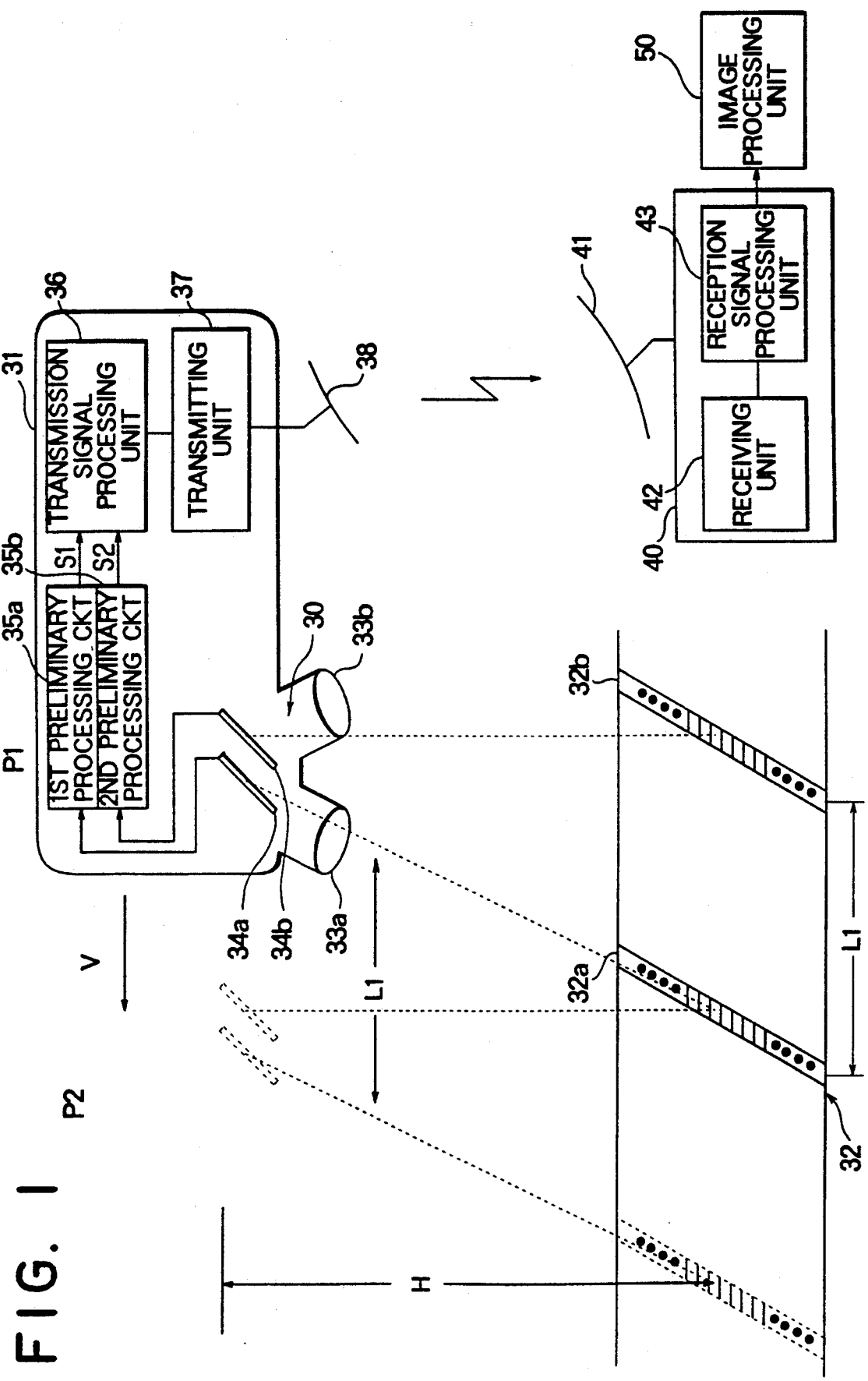
FIG. 1 is a pictorial schematic view of an object zone, an earth station, and a craft at two positions for use in describing an image data transmission system according to a first embodiment of this invention.

Referring to FIG. 1, description will be made as regards an outline of an image data transmission system according to a first embodiment of this invention.

In FIG. 1, an image pickup apparatus 30 is carried on a craft which is symbolically depicted at 31. It is assumed that the craft 31 has a velocity V and flies over an object zone 32 at a flight altitude H and along a flying direction depicted by an arrow labelled V. The image pickup apparatus 30 serves to pick up an image from the object zone 32. The craft 31 is assumed to be present at a first position P1 at a first instant.

The image pickup apparatus 30 comprises first and second optical systems 33a and 33b which are directed towards the object zone 32. The object zone 32 is divided along the flying direction into a plurality of partial zones. In the example being illustrated, only first and second partial zones 32a and 32b are illustrated. It is assumed that the first partial zone 32a is spaced apart from the second partial zone 32b by a first distance L1 forwardly of the flying direction. The first optical system 33a picks up a first partial zone 32a by a first pickup angle and forms a first partial optical image of the first partial zone 32a on a focusing area thereof. The second optical system 33b picks up a second partial zone 32b by a second pickup angle and forms a second partial optical image of the second partial zone 32b on a focusing area thereof. Each of first and second photoelectric transducers 34a and 34b is arranged on the focusing area of each of the first and the second optical systems 33a and 33b. The first and the second photoelectric transducers 34a and 34b may be, for example, a charge-coupled device (CCD). The first and the second photoelectric transducers 34a and 34b consist of a plurality of photoelectric transducing elements lying transversely of the flying direction and transduce the first and the second partial optical images to first and second partial electric signals representative of the first and the second partial zones 32a and 32b, respectively. Each of the first and the second partial electric signals comprises a succession of picture element signals having a constant frequency, which are in one-to-one correspondence to the plurality of photoelectric transducing elements and which have picture element signal levels. It is assumed that the craft 31 flies for a first duration T1 from the first position P1 to a second position P2 spaced apart from the first position P1 by the first distance L1.

As well known in the art, the stereo image is formed by processing the first partial electric signal derived from the first photoelectric transducer 34a at the first position P1 and the second partial electric signal later derived from the second photoelectric transducer 34b at the second position P2. This is because that the first partial zone 32a is again picked up by the second photoelectric transducer 34b the first duration T1 after the first partial zone 32a is previously picked up by the first photoelectric transducer 34a.

In the example, the craft 31 carries first and second preliminary processing circuits 35a and 35b connected to the first and the second photoelectric transducers 34a and 34b, respectively, a transmission signal processing unit 36, a transmitting unit 37, and an antenna 38. The first and the second partial electric signals are supplied to the first and the second preliminary processing circuits 35a and 35b, respectively. Each of the first and the second preliminary processing circuits 35a and 35b comprises an amplifier, a waveform shaping circuit, and an analog to digital converter for carrying out amplifying operation, waveform shaping operation, and analog to digital converting operation collectively as a preliminary process. The first and the second preliminary processing circuits 35a and 35b may comprise a data compression circuit known in the art. As a result of the preliminary process, the first and the second preliminary processing circuits 35a and 35b deliver first and second preliminary processed signals S1 and S2 to the transmission signal processing unit 36. As will later be described more in detail, the transmission signal processing unit 36 is for processing the first and the second preliminary processed signals S1 and S2 to supply a transmission processed signal to the transmitting unit 37. Generally, the transmitting unit 37 comprises a multiplexer and therefore may be called the multiplexer. The transmitting unit 37 transmits the transmission processed signal, as an image data signal, through the antenna 38 to an earth station 40 which will be described in the following.

The earth station 40 comprises an antenna 41, a receiving unit 42; and a reception signal processing unit 43. The image data signal is received by the receiving unit 42, as a reception image data signal, through the antenna 41. Generally, the receiving unit 42 comprises a demultiplexer and therefore may be called the demultiplexer. As will later be described, the reception image data signal is processed by the receiving unit 42 and the reception signal processing unit 43. The reception signal processing unit 43 delivers a reception processed signal to an image processing unit 50.

Referring to FIG. 2, the description will proceed to the transmission signal processing unit 36 and the reception signal processing unit 43. The transmission signal processing unit 36 comprises a delay circuit 36-1, a time difference detecting circuit 36-2, a transmission processing circuit 36-3, and a level difference detecting circuit 36-4. The delay circuit 36-1 is connected to the first preliminary processing circuit 35a and is for giving the first preliminary processed signal S1 a first delay equal to the first duration T1 to produce a delayed signal SD1 having the first delay relative to the first preliminary processed signal S1. The time difference detecting circuit 36-2 is supplied with the delayed signal SD1 and the second preliminary processed signal S2 and detects a time difference between the delayed signal SD1 and the second preliminary processed signal S2 in each of the picture element signals. The time difference detecting circuit 36-2 produces a time difference signal TD representative of the time difference.

Figure 3:
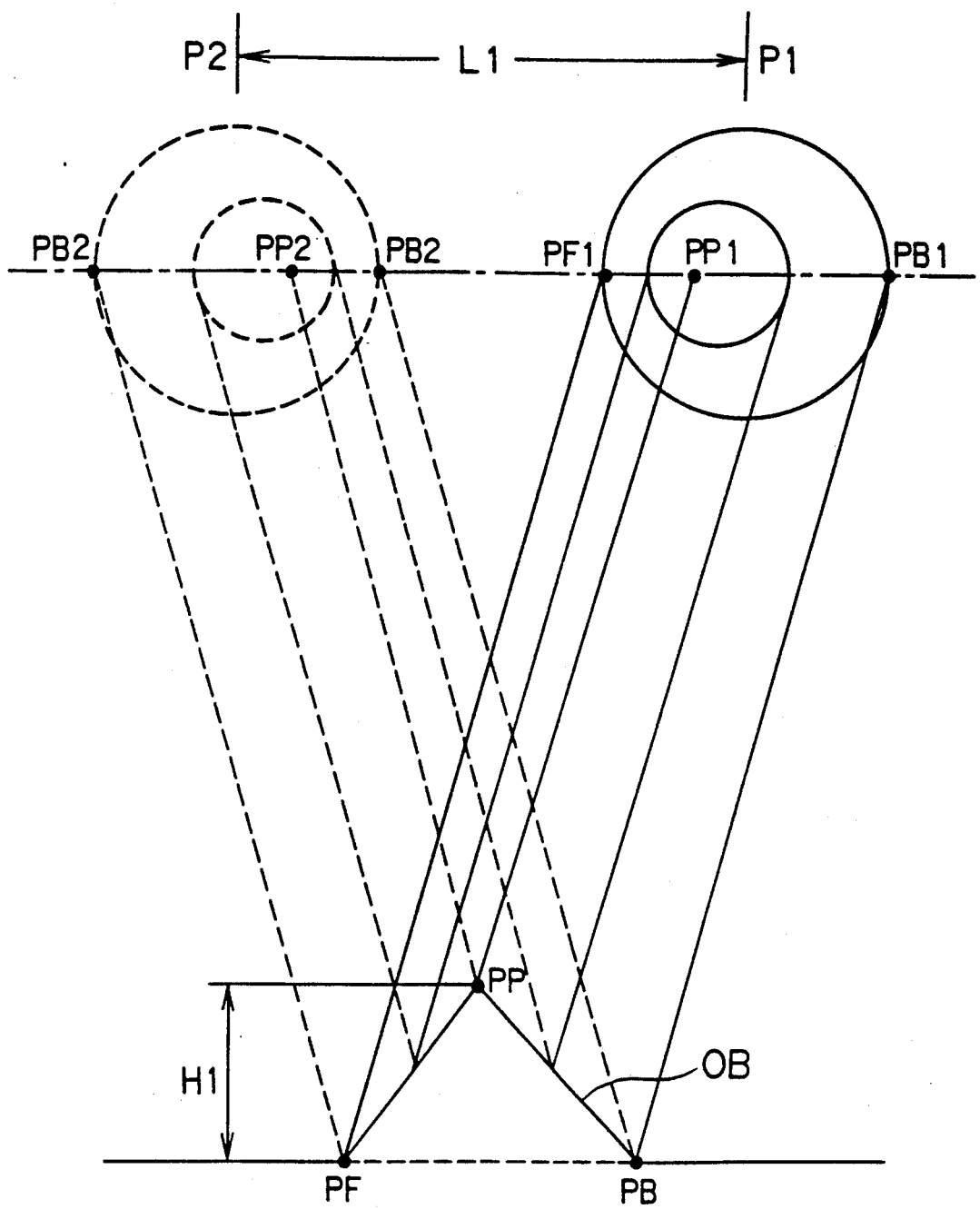
FIG. 3 is an illustration for use in describing operation of a time difference detecting circuit illustrated in FIG. 2.

Temporarily referring to FIGS. 3 and 4 in addition to FIG. 2, the description will be made as regards a principle of operation of the time difference detecting circuit 36-2. FIG. 3 illustrates a case that the optical system picks up a pickup object OB, such as a mountain, which has a conical shape and has a predetermined height H1, at the first position P1 and the second position P2. At the first position P1, the optical system picks up first and second points PF and PB and forms first and second point images of the first and the second points PF and PB at first and second points PF1 and PB1 of the focusing area. At the second position P2, the optical system picks up the first and the second points PF and PB and forms first and second point images of the first and the second points PF and PB at first and second points PF2 and PB2 of the focusing are. In this event, positional relationship between the first and the second points PF1 and PB1 is coincident with that of the first and the second points PF2 and PB2 on the focusing area. This is because the first and the second points PF and PB are on a flat ground surface. This means that the delayed signal SD1 derived from the first photoelectric transducer 34a at the first position P1 approximately coincides with the second preliminary processed signal S2 later derived from the second photoelectric transducer 34b at the second position P2 during the craft 31 flies over the object zone 32 having the flat ground surface.

On the other hand, the optical system picks up a peak point PP at the first position P1 and forms a peak point image of the peak point PP at a third point PP1 of the focusing area. At the second position P2, the optical system forms the peak point image of the peak point PP at a third point PP2 of the focusing area. It is to be noted here that the peak point image of the peak point PP is formed at different positions of the focusing area. This is because the peak point PP has the predetermined height H1. This means that the delayed signal SD1 derived from the first photoelectric transducer 34a at the first position P1 does not coincide with the second preliminary processed signal S2 later derived from the second photoelectric transducer 34b at the second position P2 during the craft 31 flies over the object zone 22 having mountains and valleys. In other words, a time difference arises between the delayed signal SD1 derived from the first photoelectric transducer 34a at the first position P1 and the second preliminary processed signal S2 later derived from the second photoelectric transducer 34b at the second position P2.

Figure 4A:
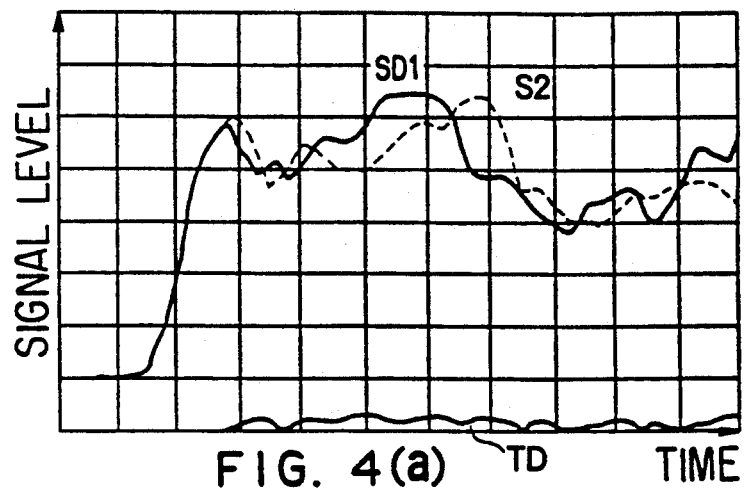
FIG. 4 shows signal waveforms for use in describing operation of a transmission signal processing unit and a reception signal processing unit which are illustrated in FIG. 2.

In FIG. 4(a), the second preliminary processed signal S2 illustrated by a dotted line deviates from the delayed signal SD1 shown by a real line when the optical system picks up the object zone having the mountains and the valleys.

Under the circumstances, the time difference detecting circuit 36-2 is for detecting the time difference between the delayed signal SD1 and the second preliminary processed signal S2 which has the same or a near picture element signal level relative to the delayed signal SD1. The time difference detecting circuit 36-2 produces the time difference signal TD having a greatly reduced signal level relative to the second preliminary processed signal S2 because correlation between the delayed signal SD1 and the second preliminary processed signal S2 is high. The time difference detecting circuit 36-2 further produces the delayed signal SD1 and the second preliminary processed signal S2 as those stands. Although the transmission signal processing unit 36 deals with digital signals, signal waveforms are illustrated in FIG. 4 in an analog form for brevity of the description.

Figure 4B:
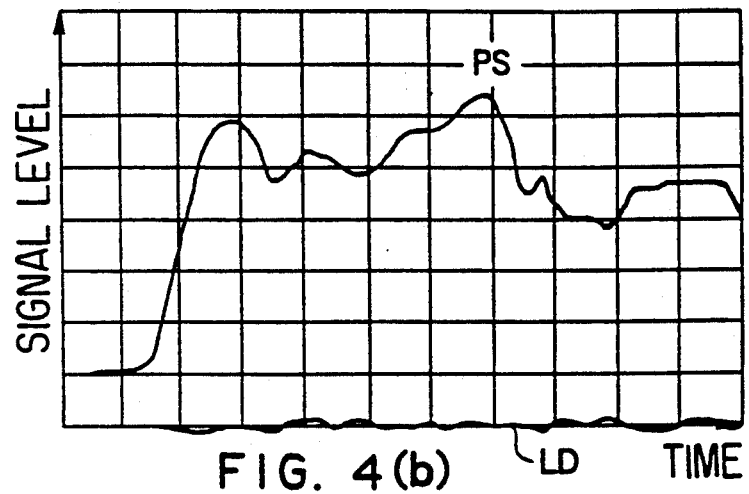

The transmission processing circuit 36-3 is supplied with the delayed signal SD1 and the time difference signal TD and processes the delayed signal SD1 by subtracting the time difference from the delayed signal SD1 in each of the picture element signals. The transmission processing circuit 36-3 produces a processed signal PS as illustrated in FIG. 4(b). In other words, the transmission processing circuit 36-3 carries out a calculation given by:

$$PS(i) = SD1(i) - TD(i),$$

where i represents a picture element number of the picture element signals. The processed signal PS has a waveform approximate to that of the second preliminary processed signal S2. The transmission processing circuit 36-3 further produces the delayed signal SD1 and the time difference signal TD as those stands.

The level difference detecting circuit 36-4 is supplied with the processed signal PS and the second preliminary processed signal S2 and detects a level difference between the processed signal PS and the second preliminary processed signal S2 in each of the picture element signals. The level difference detecting circuit 36-4 produces a level difference signal LD representing the level difference and having a greatly reduced signal level relative to the second preliminary processed signal S2 as illustrated in FIG. 4(b). An i-th level difference LD(i) of the level difference signal LD is represented by:

$$\begin{aligned} LD(i) &= S2(i) - PS(i) \\ &= S2(i) - [SD1(i) - TD(i)]. \end{aligned}$$

It is possible to reduce data quantity of the time difference signal TD and the level difference signal LD to one-tenth through one-several tenth relative to that of the second preliminary processed signal S2.

The delayed signal SD1, the time difference signal TD, and the level difference signal LD are supplied to the transmitting unit 37 as the transmission processed signal described in conjunction with FIG. 1. The transmitting unit 37 comprises a modulator and a transmitter in addition to the multiplexer. The multiplexer multiplexes the delayed signal SD1, the time difference signal TD, and the level difference signal LD into a multiplexed signal. The multiplexed signal is modulated by the modulator into a modulated signal. The transmitter transmits the modulated signal as the image data signal to the earth station 40 (FIG. 1) through the antenna 38 (FIG. 1). The transmitting unit 37 may comprise a data recorder or memory for temporarily memorizing the image data signal.

In FIG. 2(b), the receiving unit 42 receives the image data signal through the antenna 41 (FIG. 1) as the reception image data signal. The receiving unit 42 comprises the demultiplexer for demultiplexing the reception image data signal into a demultiplexed delayed signal SD1', a demultiplexed time difference signal TD', and a demultiplexed level difference signal LD'. The demultiplexed delayed signal SD1', the demultiplexed time difference signal TD', and the demultiplexed level difference signal LD' are reproductions of the delayed signal SD1, the time difference signal TD, and the level difference signal LD, respectively.

The reception signal processing unit 43 comprises a primary reception processing circuit 43-1 and a secondary reception processing circuit 43-2. The primary reception processing circuit 43-1 is supplied with the demultiplexed delayed signal SD1' and the demultiplexed time difference signal TD'. The primary reception processing circuit 43-1 carries out the same operation with the transmission processing circuit 36-3 and processes the demultiplexed delayed signal SD1' by giving the demultiplexed signal SD1' the time difference represented by the demultiplexed time difference signal TD'. The primary reception processing circuit 43-1 produces a primary processed signal PS' as a reproduction of the processed signal PS. The primary reception processing circuit 43-1 further produces the demultiplexed delayed signal SD1' as it stands.

Figure 4C:
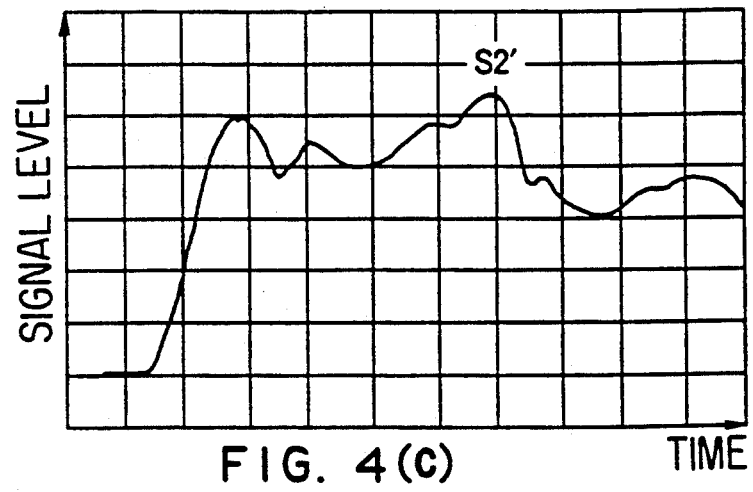

The secondary reception processing circuit 43-2 is supplied with the demultiplexed level difference signal LD' and the primary processed signal PS' and processes the primary processed signal PS' by giving the primary processed signal PS' the level difference represented by the demultiplexed level difference signal LD'. The secondary reception processing circuit 43-2 produces a secondary processed signal S2' as illustrated in FIG. 4(c). In other words, the secondary reception processing circuit 43-2 calculates a sum given by:

$$S2'(i) = PS'(i) + LD'(i).$$

Since the primary processed signal PS' and the demultiplexed level difference signal LD' are reproductions of the processed signal PS and the level difference signal LD, respectively, the i-th sum S2'(i) can be represented by:

$$\begin{aligned} S2'(i) &= PS(i) + LD(i) \\ &= PS(i) + [S2(i) - PS(i)] \\ &= S2(i). \end{aligned}$$

This means that the secondary processed signal S2' is a reproduction of the second preliminary processed signal S2. The demultiplexed delayed signal SD1' and the secondary processed signal S2' are supplied to the image processing unit 50 as the reception processed signal described in conjunction with FIG. 1. The image processing unit 50 processes the demultiplexed delayed signal SD1' and the secondary processed signal S2' to form the stereo image. The above-mentioned operation is successively carried out for all of the partial zones to form the stereo image of the object zone 32.

Figure 5:
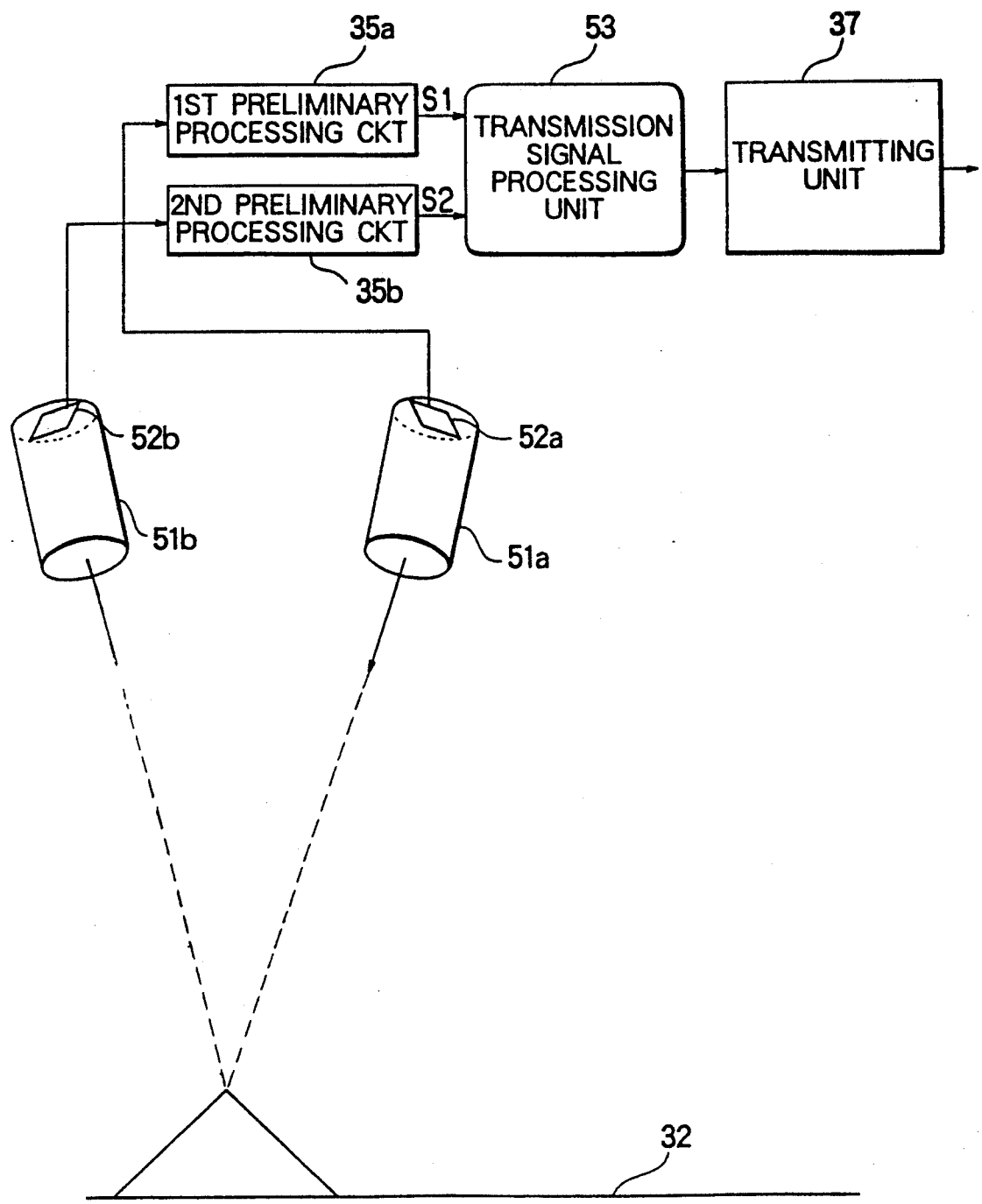
FIG. 5 is a pictorial schematic view of an object zone and a craft for use in describing an image data transmission system according to a second embodiment of this invention.

Referring to FIGS. 5 and 6, the description will proceed to an image data transmission system according to a second embodiment of this invention. The image data transmission system comprises similar parts designated by like reference numerals except that first and second optical systems 51a and 51b, first and second photoelectric transducers 52a and 52b, and a transmission signal processing unit 53.

In FIG. 5, the first and the second optical systems 51a and 51b are spaced apart from each other and are directed to the same partial zone of the object zone 32 and therefore pick up first and second partial optical images of the same partial zone by first and second pickup angles at the same time. The first and the second photoelectric transducers 52a and 52b transduce the first and the second partial optical images to first and second partial electric signals, respectively, and supplies the first and the second partial electric signals to the first and the second preliminary processing circuits 35a and 35b, respectively. The first and the second preliminary processing circuits 35a and 35b deliver the first and the second preliminary processed signals S1 and S2, respectively, derived from the same partial zone to the transmission signal processing unit 53 at the same time. This means that it is unnecessary to give the first preliminary processed signal S1 the delay.

In FIG. 6, although each of the first and the second photoelectric transducers 52a and 52b is implemented by a two-dimensional charge-coupled device, the first and the second photoelectric transducers 52a and 52b may be implemented by a one-dimensional (linear array) charge-coupled device illustrated in FIG. 2. The transmission signal processing unit 53 does not use the delay circuit for the reason mentioned above. In the manner described in conjunction with FIG. 2, the time difference detecting circuit 36-2 detects the time difference between the first and the second preliminary processed signals S1 and S2 in each of the picture element signals. The transmission signal processing unit 53 processes the first and the second preliminary processed signals S1 and S2 in the manner described in relation to FIG. 2. Processing operation of the transmission signal processing unit 53 is therefore omitted. The reception signal processing unit 43 in the earth station also carries out signal processing operation similar to that described in conjunction with FIG. 2.

Figure 7:
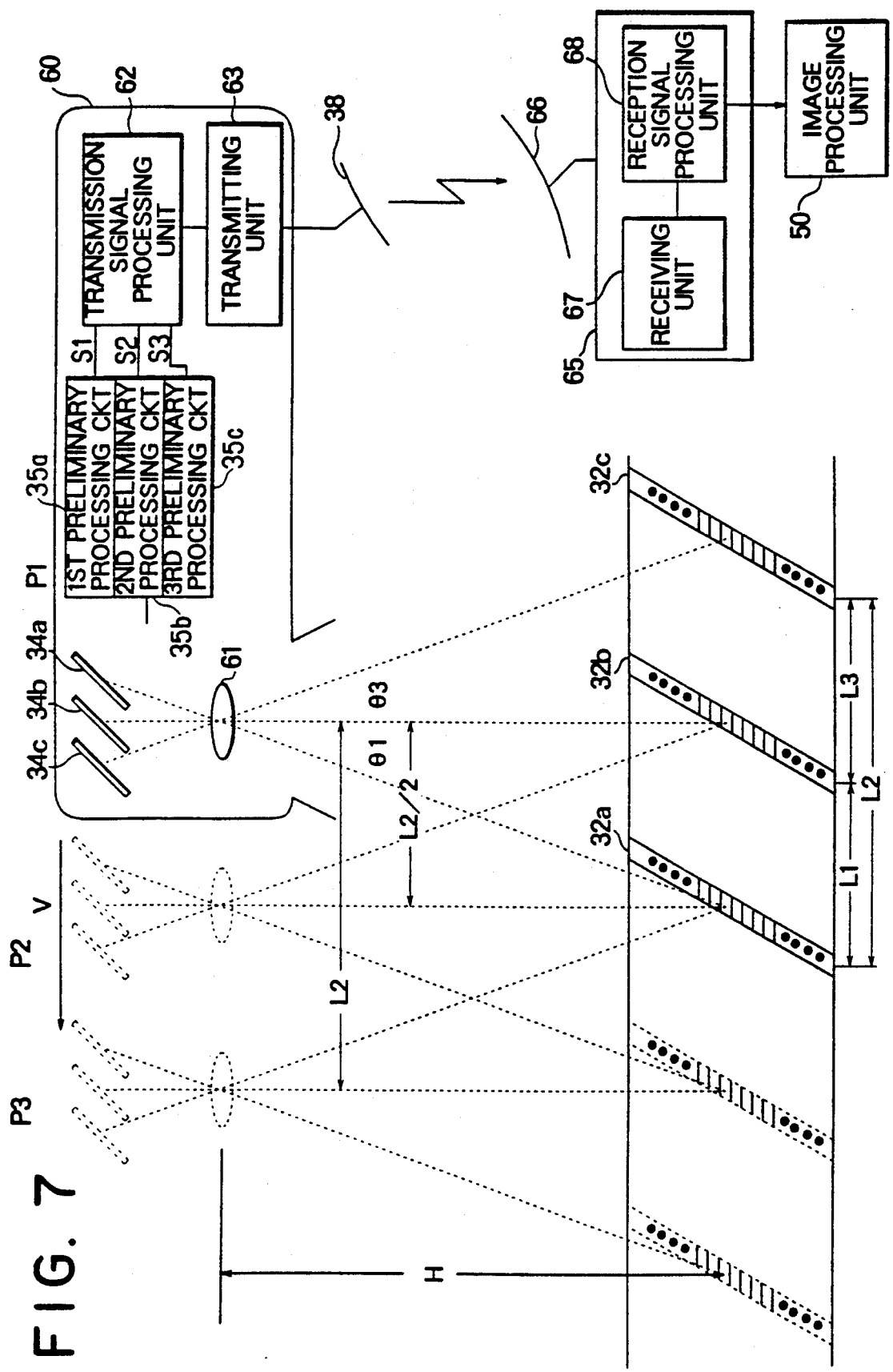
FIG. 7 is a pictorial schematic view of an object zone, an earth station, and a craft at three positions for use in describing an image data transmission system according to a third embodiment of this invention.

Referring to FIGS. 7 and 8, the description will be made as regards an image data transmission system according to a third embodiment of this invention. The image data transmission system is similar to that disclosed in the Nagura patent referred to before except that a craft 60 includes an improved transmission signal processing unit 62 and that an earth station 65 includes an improved reception signal processing unit 68.

In FIG. 7, the craft 60 has the velocity V and flies over the object zone 32 at the flight altitude H along the flying direction depicted by an arrow labelled V. A single optical system 61 forms an optical image of the object zone 32 on a focusing area thereof. The first through a third photoelectric transducers 34a to 34c are arranged parallel on the focusing area transversely of the flying direction. The object zone 32 is divided along the flying direction into a plurality of partial zones from which partial optical images are picked up to be focused on the focusing area. In the example, only the first through the third partial zones 32a to 32c are illustrated. The second partial zone 32b is between the first and the third partial zones 32a and 32c and lies right under the craft 60 at the first position P1. The first partial zone 32a is positioned at the first distance L1 forward from the second partial zone 32b along the flying direction. The first partial zone 32a is further positioned at a second distance L2 (=2L1) forward from the third partial zone 32c along the flying direction. In other words, the third partial zone 32c is positioned at a third distance L3 backward from the second partial zone 32b along the flying direction. It will be assumed that the first distance L1 is equal to the third distance L3.

At the first position P1, the first photoelectric transducer 34a transduces the first partial optical image picked up from the first partial zone 32a by a first pickup angle $\theta 1$ to the first partial electric signal. The second photoelectric transducer 34b transduces the second partial optical image picked up from the second partial zone 32b by a second pickup angle $\theta 2$ to the second partial electric signal. The third photoelectric transducer 34c transduces the third partial optical image picked up from the third partial zone 32c by a third pickup angle $\theta 3$ to a third partial electric signal. It is to be noted here that the second pickup angle $\theta 2$ is equal to zero degree.

The craft 60 flies for the first duration T1 from the first position P1 to the second position P2 spaced apart from the first position P1 by the first distance L1 and flies a second duration T2 (=2T1) from the first position P1 to a third position P3 spaced apart from the first position by the second distance L2. As well known in the art, the stereo image is formed by processing the first partial electric signal derived from the first photoelectric transducer 34a at the first position P1, the second partial electric signal derived from the second photoelectric transducer 34b at the second position P2 after a lapse of the first duration T1, and the third partial electric signal derived from the third photoelectric transducer 34c at the third position P3 after a lapse of the second duration T2.

The craft 60 carries the first and a third preliminary processing circuits 35a to 35c connected to the first through the third photoelectric transducers 34a to 34c, respectively, the transmission signal processing unit 62, a transmitting unit 63, and the antenna 38. The first through the third partial electric signals are supplied to the first through the third preliminary processing circuits 35a to 35c, respectively. The first through the third preliminary processing circuits 35a to 35c deliver the first through a third preliminary processed signals S1 to S3 to the transmission signal processing unit 62. As will later be described more in detail, the transmission signal processing unit 62 processes the first through the third preliminary processed signals S1 to S3 and delivers a transmission processed signal to the transmitting unit 63. The transmitting unit 63 is similar to the transmitting unit 37 illustrated in FIG. 1 and transmits the transmission processed signal, as the image data signal, through the antenna 38 to the earth station 65.

The earth station 65 comprises an antenna 66, a receiving unit 67 in addition to the reception signal processing unit 68. The receiving unit 67 is similar to the receiving unit 42 illustrated in FIG. 1 and receives the image data signal, as a reception image data signal, through the antenna 66. As will later be described, the reception image data signal is processed by the receiving unit 67 and the reception signal processing unit 68. The reception signal processing unit 68 supplies a reception processed signal to the image processing unit 50.

In FIG. 8, the transmission signal processing unit 62 comprises first and second delay circuits 62-1a and 62-1b, first and second time difference detecting circuits 62-2a and 62-2b, first and second transmission processing circuits 62-3a and 62-3b, and first and second level difference detecting circuits 62-4a and 62-4b. The first delay circuit 62-1a is connected to the first preliminary processing circuit 35a and is for giving the first preliminary processed signal S1 a first delay equal to the second duration T2 to produce a first delayed signal SD1 having the first delay relative to the first preliminary processed signal S1. The second delay circuit 62-1b is connected to the second preliminary processing circuit 35b and is for giving the second preliminary processed signal S2 a second delay equal to the first duration T1 to produce a second delayed signal SD2 having the second delay relative to the second preliminary processed signal S1.

In the manner mentioned in conjunction with FIG. 2, the first time difference detecting circuit 62-2a detects a first time difference between the first delayed signal SD1 and the second delayed signal SD2 in each of the picture element signals. The first time difference detecting circuit 62-2a produces a first time difference signal TD1 representing the first difference and having a greatly reduced signal level relative to the second delayed signal SD2 because correlation between the first and the second delayed signals SD1 and SD2 is high. The first time difference detecting circuit 62-2a further produces the first delayed signal SD1 as it stands.

In the same manner described above, the second time difference detecting circuit 62-2b detects a second time difference between the second delayed signal SD2 and the third preliminary processed signal S3 in each of the picture element signals. The second time difference detecting circuit 62-2b produces a second time difference signal TD2 representing the second difference and having a greatly reduced signal level relative to the third preliminary processed signal S3. The second time difference detecting circuit 62-2b further produces the second delayed signal SD2 as it stands.

The first transmission processing circuit 62-3a is supplied with the first delayed signal SD1 and the first time difference signal TD1. In the manner described in relation to FIG. 2, the first transmission processing circuit 62-3a processes the first delayed signal SD1 by subtracting the first time difference from the first delayed signal SD1 in each of the picture element signals. The first transmission processing circuit 62-3a produces a first processed signal PS1. The first processed signal PS1 has a signal waveform approximate to that of the second delayed signal SD2. The first transmission processing circuit 62-3a further produces the first delayed signal SD1 and the first time difference signal TD1 as those stands.

Similarly, the second transmission processing circuit 62-3b is supplied with the second delayed signal SD2 and the second time difference signal TD2. The second transmission processing circuit 62-3b processes the second delayed signal SD2 by subtracting the second time difference from the second delayed signal SD2 in each of the picture element signals. The second transmission processing circuit 62-3a produces a second processed signal PS2. The second processed signal PS2 has a signal waveform approximate to that of the third preliminary processed signal S3. The second transmission processing circuit 62-3b further produces the second time difference signal TD2 as it stands.

The first level difference detecting circuit 62-4a is supplied with the first processed signal PS1 and the second delayed signal SD2. In the manner mentioned in conjunction with FIG. 2, the first level difference detecting circuit 62-4a detects a first level difference between the first processed signal PS1 and the second delayed signal SD2 in each of the picture element signals. The first level difference detecting circuit 62-4a produces a first level difference signal LD1 representing the first level difference and having a greatly reduced signal level relative to the second delayed signal SD2.

The second level difference detecting circuit 62-4b is supplied with the second processed signal PS2 and the third preliminary processed signal S3. The second level difference detecting circuit 62-4b detects a second level difference between the second processed signal PS2 and the third preliminary processed signal S3 in each of the picture element signals. The second level difference detecting circuit 62-4b produces a second level difference signal LD2 representing the second level difference and having a greatly reduced signal level relative to the third preliminary processed signal S3.

The first delayed signal SD1, the first and the second time difference signals TD1 and TD2, and the first and the second level difference signals LD1 and LD2 are supplied to the transmitting unit 63 as the transmission processed signal described in conjunction with FIG. 7. As described in conjunction with FIG. 2, the transmitting unit 63 comprises the multiplexer, the modulator, and the transmitter. The multiplexer multiplexes the first delayed signal SD1, the first and the second time difference signals TD1 and TD2, and the first and the second level difference signals LD1 and LD2 into a multiplexed signal. The multiplexed signal is modulated by the modulator into a modulated signal. The transmitter transmits the modulated signal as the image data signal to the earth station 65 (FIG. 7) through the antenna 38 (FIG. 7).

In FIG. 8(b), the receiving unit 67 receives the image data signal through the antenna 66 (FIG. 7) as the reception image data signal. The receiving unit 67 comprises a demultiplexer for demultiplexing the reception image data signal into a first demultiplexed delayed signal SD1', first and second demultiplexed time difference signals TD1' and TD2', and first and second demultiplexed level difference signals LD1' and LD2'. The reception signal processing unit 68 comprises first and second primary reception processing circuits 68-1a and 68-1b and first and second secondary reception processing circuits 68-2a and 68-2b. The first primary reception processing circuit 68-1a is supplied with the first demultiplexed delayed signal SD1' and the first demultiplexed time difference signal TD1'. The first primary reception processing circuit 68-1a carries out the same operation with the first transmission processing circuit 62-3a and processes the first demultiplexed delayed signal SD1' by giving the first demultiplexed delayed signal SD1' the first time difference represented by the first demultiplexed time difference signal TD1'. The first primary reception processing circuit 68-1a produces a first primary processed signal PS1' as a reproduction of the first processed signal PS1. The first primary reception processing circuit 68-1a further produces the first demultiplexed delayed signal SD1' as it stands.

The first secondary reception processing circuit 68-2a is supplied with the first demultiplexed level difference signal LD1' and the first primary processed signal PS1' and processes the first primary processed signal PS1' by giving the first primary processed signal PS1' the first level difference represented by the first demultiplexed level difference signal LD1'. The first secondary reception processing circuit 68-2a produces a first secondary processed signal SD2' as a reproduction of the second delayed signal SD2.

The second primary reception processing circuit 68-1b is supplied with the first secondary processed signal SD2' and the second demultiplexed time difference signal TD2'. The second primary reception processing circuit 68-1b carries out the same operation with the second transmission processing circuit 62-3b and processes the first secondary processed signal SD2' by giving the first secondary processed signal SD2' the second time difference represented by the second demultiplexed time difference signal TD2'. The second primary reception processing circuit 68-1b produces a second primary processed signal PS2' as a reproduction of the second processed signal PS2.

The second secondary reception processing circuit 68-2b is supplied with the second demultiplexed level difference signal LD2' and the second primary processed signal PS2' and processes the second primary processed signal PS2' by giving the second primary processed signal PS2' the second level difference represented by the second demultiplexed level difference signal LD2'. The second secondary reception processing circuit 68-2b produces a second secondary processed signal S3' as a reproduction of the third preliminary processed signal S3.

The first demultiplexed delayed signal SD1', the first secondary processed signal SD2', and the second secondary processed signal S3' are supplied to the image processing unit 50 as the reception processed signal described in conjunction with FIG. 7. The image processing unit 50 processes the first demultiplexed delayed signal SD1', the first secondary processed signal SD2', and the second secondary processed signal S3' to form the stereo image. The above-mentioned operation is successively carried out for all of the partial zones to form the stereo image of the object zone 32.

Figure 9:
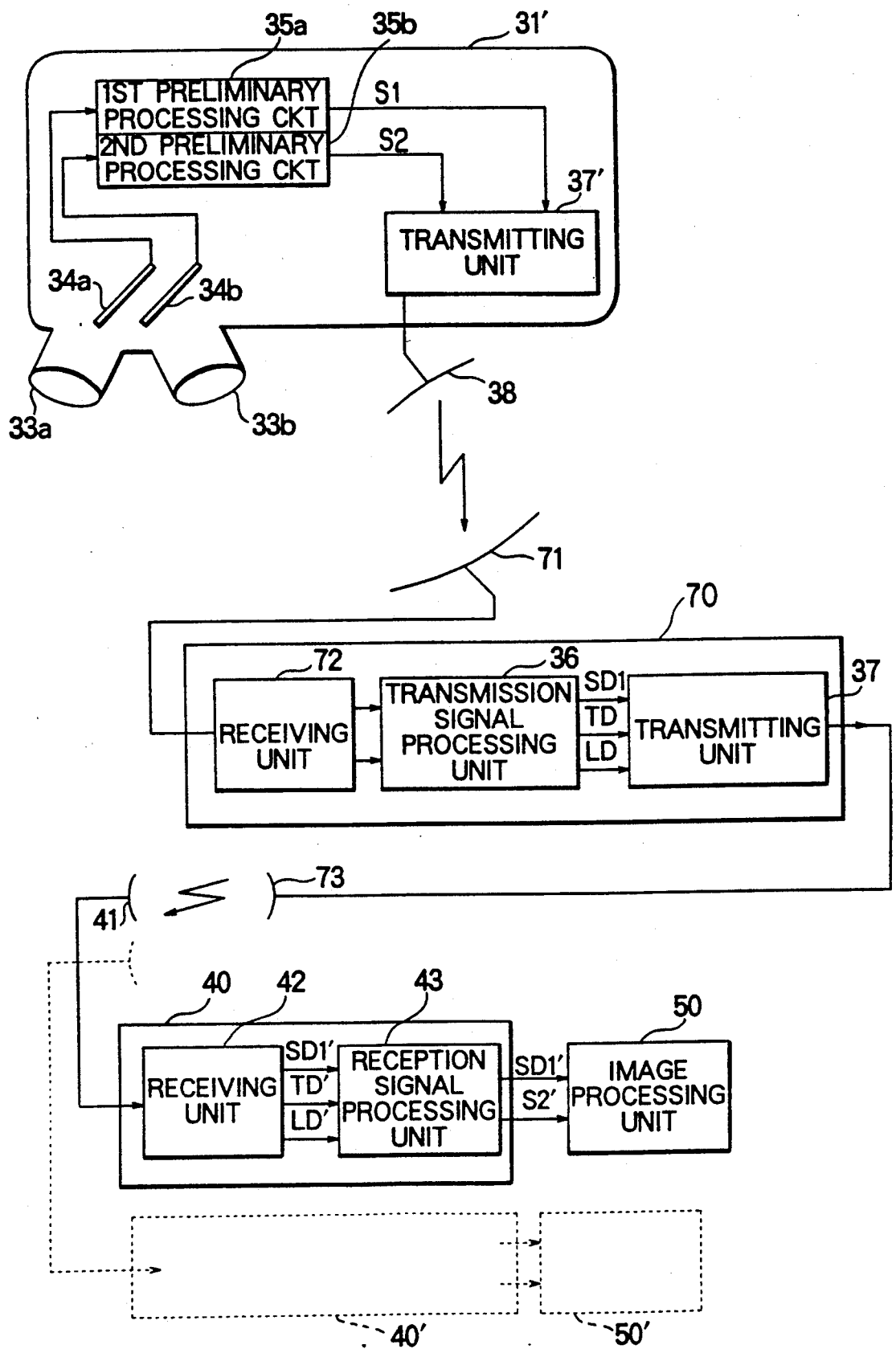
FIG. 9 is a block diagram of a craft, a repeater station, and an earth station for use in describing a modification of an image data transmission system according to the first embodiment of this invention.

Referring to FIG. 9, the description will proceed to a modification of the image data transmission system according to this invention. A craft 31' is similar to the craft 31 illustrated in FIG. 1 except that a transmitting unit 37' transmits the first and the second preliminary processed signals S1 and S2 to a repeater station 70. This is suitable for the case that the first duration T1 is a long time. This is because that it is hard to give the first preliminary processed signal the first duration T1 in the craft 31' when the first duration T1 is too long. In this event, the first and the second preliminary processed signals S1 and S2 are multiplexed into a multiplexed preliminary processed signal by a multiplexer included in the transmitting unit 37'. The multiplexed preliminary processed signal is transmitted, as a preliminary processed image data signal, from the transmitting unit 37' to the repeater station 70.

In the example, the repeater station 70 is in a main earth station. The repeater station 70 may be in a craft, such as a space station, different from the craft 31'. At any rate, the repeater station 70 is for relaying between the craft 31' and a plurality of earth stations. If the repeater station 70 is in the craft, the repeater station 70 is coupled to the plurality of earth stations by radio channels. When the repeater station 70 is in the main earth station, the repeater station 70 is coupled to the plurality of earth stations by radio channels or is connected to the plurality of earth stations by wire transmission lines, such as optical fiber cables. For brevity, only the earth stations 40 and another earth station 40' are illustrated. The other earth station 40' is similar in construction to the earth station 40 and is combined with another image processing unit 50' similar to the image processing unit 50.

The repeater station 70 comprises an antenna 71 and a receiving unit 72. The receiving unit 72 receives the preliminary processed image data signal through the antenna 71 as a reception preliminary processed image data signal. The reception preliminary processed image data signal is demultiplexed into first and second demultiplexed preliminary processed signals by a demultiplexer included in the receiving unit 72. The repeater station 70 further comprises the transmission signal processing unit 36 and the transmitting unit 37 both of which are described in conjunction with FIG. 2.

In the manner described in relation to FIG. 2, the transmission signal processing unit 36 processes the first and the second demultiplexed preliminary processed signals and produces the delayed signals S1, the time difference signal TD, and the level difference signal LD. The delayed signal S1, the time difference signal TD, and the level difference signal LD are multiplexed by a multiplexer included in the transmitting unit 37 and transmitted from the transmitting unit 37 through an antenna 73 as the image data signal.

In the earth station 40, the receiving unit 42 receives the image data signal through the antenna 41 as the reception image data signal. In the manner mentioned in conjunction with FIG. 2, the reception image data signal is demultiplexed into the demultiplexed delayed signal SD1', the demultiplexed time difference signal TD', and the demultiplexed level difference signal LD' by a demultiplexer included in the receiving unit 42. The reception signal processing unit 43 processes the demultiplexed delayed signal S1', the demultiplexed time difference signal TD', and the demultiplexed level difference signal LD' and delivers the demultiplexed delayed signal SD1' and the secondary processed signal S2' to the image processing unit 50. The above-mentioned modification is applied to the second and the third embodiments which are described in conjunction with FIGS. 5 and 7.

Referring to FIGS. 10 and 11, the description will proceed to an image data transmission system according to a fourth embodiment of this invention. The image data transmission system is similar to that illustrated in FIG. 2 except that a transmission signal processing unit 75, a transmitting unit 76, a receiving unit 77, and a reception signal processing unit 78. In other words, the image data transmission system is suitable for combining with the first and the second optical systems 34a and 34b illustrated in FIG. 1.

In FIG. 10(a), the transmission signal processing unit 75 comprises a delay circuit 75-1, a transmission interpolating circuit 75-2, a time difference detecting circuit 75-3, and a transmission sampling circuit 75-4. The delay circuit 75-1 is connected to the first preliminary processing circuit 35a and is for giving the first preliminary processed signal S1 the first delay equal to the first duration T1 to produce a delayed signal SD1 having the first delay relative to the first preliminary processed signal S1.

Figure 11A:
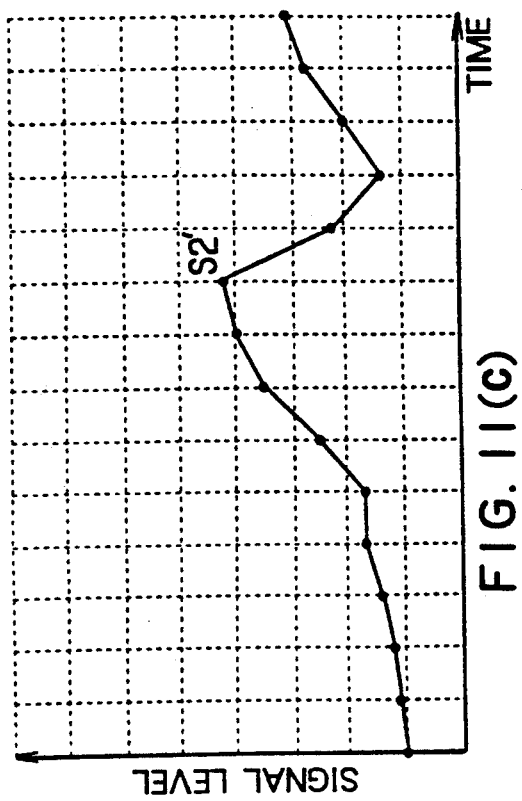
FIG. 11 shows signal waveforms for use in describing operation of a transmission signal processing unit and a reception signal processing unit which are illustrated in FIG. 10.

In FIG. 11(a), the second preliminary processed signal S2 illustrated by a dotted line deviates from delayed signal SD1 shown by a real line for the reason mentioned in conjunction with FIGS. 3 and 4. The picture element signals of each of the delayed signal SD1 and the second preliminary processed signal S2 are depicted by black circles and have a picture element time interval t1 and the picture element signal levels. Although the transmission signal processing unit 75 deals with digital signals, signal waveforms are illustrated in FIG. 11 in an analog form for brevity of the description.

Figure 11B:
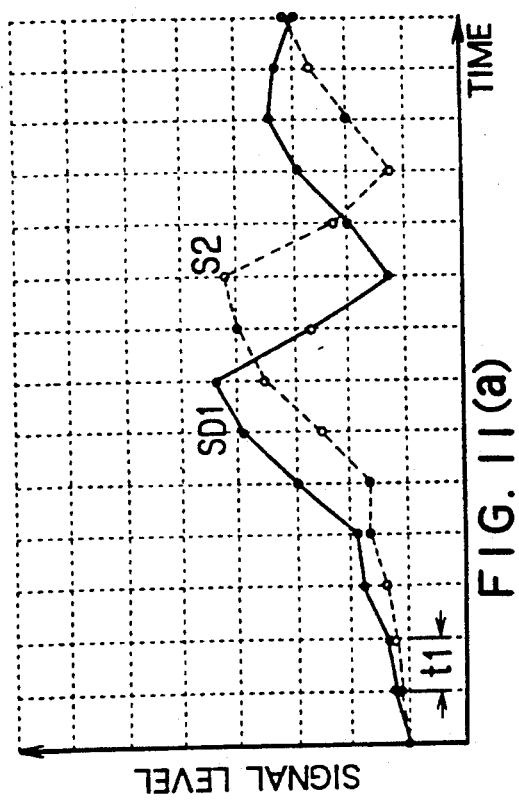
Figure 11C:
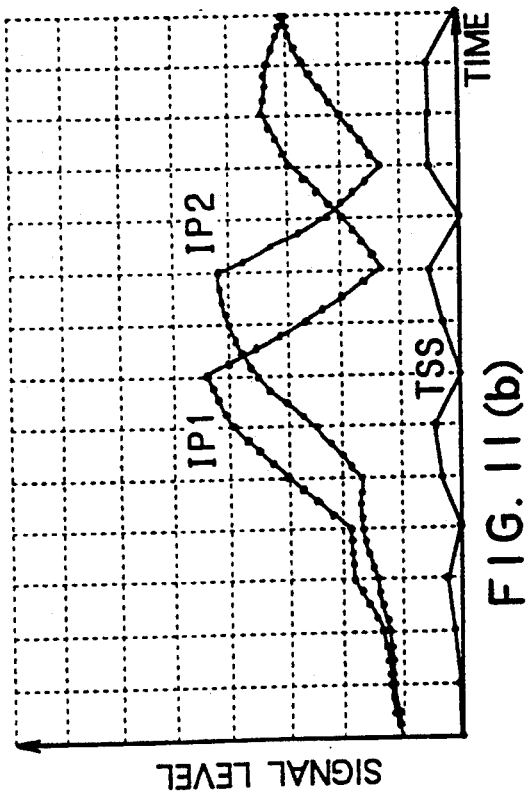

The transmission interpolating circuit 75-2 is supplied with the delayed signal SD1 and the second preliminary processed signal S2. In an interpolation manner known in the art, the transmission interpolating circuit 75-2 interpolates the delayed signal SD1 and the second preliminary processed signal S2 at a predetermined interpolation interval. In FIG. 11(b), the predetermined interpolation interval is equal to a quarter of the picture element time interval t1. With respect to a single picture element time interval t1, the transmission interpolating circuit 75-2 divides the picture element time interval t1 into first through fourth divided time instants and decides, by the use of an adjacent signal level, first through fourth interpolation signal levels at the first through the fourth divided time instants, respectively. As a result of interpolating operation, the transmission interpolating circuit 75-2 produces first and second transmission interpolated signals IP1 and IP2 as shown in FIG. 11(b). The above-mentioned interpolating operation is carried out to improve detecting precision of the time difference detecting circuit 75-3.

The time difference detecting circuit 75-3 is supplied with the first and the second transmission interpolated signals IP1 and IP2. In the manner mentioned in conjunction with FIG. 2, the time difference detecting circuit 75-3 detects a time difference between the first and the second transmission interpolated signals IP1 and IP2 at a predetermined detection interval equal to the predetermined interpolation interval. The time difference detecting circuit 75-3 supplies a time difference signal TDS representative of the time difference to the transmission sampling circuit 75-4. It is to be noted here that it is unnecessary for the time difference signal TDS to have a signal interval shorter than the picture element time interval t1.

Under the circumstances, the transmission sampling circuit 75-4 samples the time difference signal TDS at the picture element time interval t1, namely, in synchronism with the picture element signals, and produces a transmission sampled signal TSS having a signal interval equal to the picture element time interval t1. As illustrated in FIG. 11(b), the transmission sampled signal TSS has a greatly reduced signal level relative to the second preliminary processed signal S2, even if the first and the second transmission interpolated signals IP1 and IP2 have signal levels which drastically vary.

The delayed signal SD1 and the transmission sampled signal TSS are supplied to the transmitting unit 76 which comprises the multiplier, the modulator, and the transmitter as mentioned in relation to FIG. 2. The transmitting unit 76 may comprise a data recorder or memory. The delayed signal SD1 and the transmission sampled signal TSS are multiplexed by the multiplexer into a multiplexed signal. The multiplexed signal is modulated by the modulator into a modulated signal. The modulated signal is transmitted from the transmitter to the earth station as the image data signal.

In FIG. 10(b), the receiving unit 77 receives the image data signal as a reception image data signal. The reception image data signal is demultiplexed into a demultiplexed delayed signal SD1' and a demultiplexed transmission sampled signal TSS' by a demultiplexer included in the receiving unit 77. The demultiplexed delayed signal SD1' and the demultiplexed transmission sampled signal TSS' are reproductions of the delayed signal SD1 and the transmission sampled signal TSS, respectively. The reception signal processing unit 78 comprises a reception interpolating circuit 78-1, a reception processing circuit 78-2, and a reception sampling circuit 78-3. The reception interpolating circuit 78-1 carries out interpolating operation similar to that of the transmission interpolating circuit 75-2 shown in FIG. 10(a). The reception interpolating circuit 78-1 interpolates the demultiplexed delayed signal SD1' at the predetermined interpolation interval and delivers a reception interpolated signal IP1' to the reception processing circuit 78-2. The reception interpolated signal IP1' is a reproduction of the first transmission interpolated signal IP1.

The reception processing circuit 78-2 is supplied with the demultiplexed transmission sampled signal TSS' in addition to the reception interpolated signal IP1'. The reception processing circuit 78-2 processes the reception interpolated signal IP1' by giving the time difference represented by the demultiplexed transmission sampled signal TSS' to the reception interpolated signal IP1' at the picture element time interval t1. The reception processing circuit 78-2 supplies a reception processed signal to the reception sampling circuit 78-3. The reception sampling circuit 78-3 samples the reception processed signal at the picture element time interval t1 and produces a reception sampled signal S2' illustrated in FIG. 11(c) as a reproduction of the second preliminary processed signal S2. The demultiplexed delayed signal SD1' and the reception sampled signal S2' are supplied to the image processing unit 50 to form the stereo image.

Referring to FIG. 12, the description will proceed to an image data transmission system according to a fifth embodiment of this invention. The image data transmission system is similar to that illustrated in FIG. 10 except that first and second photoelectric transducers 52a and 52b and a transmission signal processing unit 81. The image data transmission system is suitable for combining with the first and the second optical systems 51a and 51b illustrated in FIG. 5. The first and the second photoelectric transducers 52a and 52b are implemented by the two-dimensional charge-coupled device as mentioned in conjunction with FIG. 6. The transmission signal processing unit 81 does not use the delay circuit 75-1 described in conjunction with FIG. 10 because the first and the second photoelectric transducers 52a and 52b transduce the first and the second partial optical images of the same partial zone to the first and the second partial electric signals at the same time as mentioned in relation to FIG. 5. The transmission signal processing unit 81 therefore comprises the transmission interpolating circuit 75-2, the time difference detecting circuit 75-3, and the transmission sampling circuit 75-4.

In the transmission signal processing unit 81, transmission interpolating circuit 81-1 is supplied with the first and the second preliminary processed signals S1 and S2 and interpolates the first and the second preliminary processed signals S1 and S2 at the predetermined interpolation interval as mentioned in relation to FIG. 10. The transmission interpolating circuit 81-1 produces the first and the second transmission signals IP1 and IP2. The time difference detecting circuit 75-3 detects the time difference between the first and the second transmission interpolated signals IP1 and IP2 at the detection time interval equal to the predetermined interpolation interval and produces the time difference signal TDS representative of the time difference. The transmission sampling circuit 75-4 samples the time difference signal TDS at the picture element time interval t1 and produces the transmission sampled signal TSS. The first preliminary processed signal S1 and the transmission sampled signal TSS are multiplexed into the multiplexed signal by the multiplexer included in the transmitting unit 76. The multiplexed signal is transmitted from the transmitting unit 76 to the earth station as the image data signal.

In FIG. 12(b), the receiving unit 77 receives the image data signal as the reception image data signal. The reception image data signal is demultiplexed into a first demultiplexed preliminary processed signal S1' and the demultiplexed transmission sampled signal TSS' by the demultiplexer included in the receiving unit 77. In the reception signal processing unit 78, the reception interpolating circuit 78-1 interpolates the first demultiplexed preliminary processed signal S1' at the predetermined interpolation interval and delivers the reception interpolated signal IP1' to the reception processing circuit 78-2.

The reception processing circuit 78-2 processes the reception interpolated signal IP1' by giving the time difference represented by the demultiplexed transmission sampled signal TSS' to the reception interpolated signal IP1'. The reception processing circuit 78-2 supplies the reception processed signal to the reception sampling circuit 78-3. The reception sampling circuit 78-3 samples the reception processed signal at the picture element time interval t1 and produces the reception sampled signal S2'. The first demultiplexed preliminary processed signal S1' and the reception sampled signal S2' are supplied to the image processing unit 50 to form the stereo image.

Referring to FIG. 13, the description will be made as regards an image data transmission system according to a sixth embodiment of this invention. The image data transmission system is suitable for the type described with reference to FIG. 7. The image data transmission system is therefore similar to that illustrated in FIG. 8 except a transmission signal processing unit 85, a transmitting unit 86.

As described in conjunction with FIG. 8, the stereo image is formed by processing the first partial electric signal derived from the first photoelectric transducer 34a at the first position P1, the second partial electric signal derived from the second photoelectric transducer 34b after a lapse of the first duration T1 at the second position P2, and the third partial electric signal derived from the third photoelectric transducer 34c after a lapse of the second duration T2 at the third position P2.

In FIG. 13(a), the transmission signal processing unit 85 comprises first and second delay circuits 85-1a and 85-1b, a transmission interpolating circuit 85-2, first and second time difference detecting circuits 85-3a and 85-3b, and first and second transmission sampling circuits 85-4a and 85-4b. The first delay circuit 85-1a is connected to the first preliminary processing circuit 35a and gives the first preliminary processed signal S1 the first delay equal to the second duration T2 to produce the first delayed signal SD1 having the first delay. The second delay circuit 85-1b is connected to the second preliminary processing circuit 35b and gives the second preliminary processed signal S2 the second delay equal to the first duration T1 to produce the second delayed signal SD2 having the second delay.

The transmission interpolating circuit 85-2 interpolates the first delayed signal SD1, the second delayed signal SD2, and the third preliminary processed signal S3 at the predetermined interpolation interval in the manner mentioned in conjunction with FIGS. 11 and 12. The transmission interpolating circuit 85-2 produces first through third transmission interpolated signals IP1, IP2, and IP3 each of which corresponds to each of the first and the second delayed signals SD1 and SD2 and the third preliminary processed signal S3. The first time difference detecting circuit 85-3a is supplied with the first and the second transmission interpolated signals IP1 and IP2 and detects a first time difference between the first and the second transmission interpolated signals IP1 and IP2 at the detection time interval equal to the predetermined interpolation interval. The first time difference detecting circuit 85-3a supplies a first time difference signal TDS1 representative of the first time difference to the first transmission sampling circuit 85-4a. Similarly, the second time difference detecting circuit 85-3b is supplied with the second and the third transmission interpolated signals IP2 and IP3 and detects a second time difference between the second and the third transmission interpolated signals IP2 and IP3 at the detection time interval. The second time difference detecting circuit 85-3b delivers a second time difference signal TDS2 representative of the second time difference to the second transmission sampling circuit 85-4b.

In the manner mentioned in conjunction with FIG. 10, the first and the second transmission sampling circuits 85-4a and 85-4b carry out sampling operation at the picture element time interval t1 and produce first and second transmission sampled signals TSS1 and TSS2 are supplied to the transmitting unit 86 and multiplexed into a multiplexed signal by a multiplexer included in the transmitting unit 86. The multiplexed signal is transmitted from the transmitting unit 86 to the earth station as the image data signal.

In FIG. 13(b), the image data signal is received by a receiving unit 87 in the earth station and is demultiplexed, by a demultiplexer included in the receiving unit 87, into a first demultiplexed delayed signal SD1' and first and second demultiplexed transmission sampled signals TSS1' and TSS2'. The first demultiplexed delayed signal SD1' is a reproduction of the first delayed signal SD1.

A reception signal processing unit 88 comprises first and second reception interpolating circuits 88-1a and 88-1b, first and second reception processing circuits 88-2a and 88-2b, and first and second reception sampling circuits 88-3a and 88-3b. The first reception interpolating circuit 88-1a carries out interpolating operation similar to that of the transmission interpolating circuit 85-2 shown in FIG. 13(a). The first reception interpolating circuit 88-1a interpolates the first demultiplexed delayed signal SD1' at the predetermined interpolation interval and delivers a first reception interpolated signal to the first reception processing circuit 88-2a.

The first reception processing circuit 88-2a is supplied with the first reception interpolated signal and the first demultiplexed transmission sampled signals TSS1' and processes the first reception interpolated signal by giving the first time difference represented by the first demultiplexed transmission sampled signals TSS1' to the first reception interpolated signal. The first reception processing circuit 88-2a delivers a first reception processed signal to the first reception sampling circuit 88-3a. The first reception sampling circuit 88-3a samples the first reception processed signal at the picture element time interval t1 and produces a first reception sampled signal SD2' as a reproduction of the second delayed signal SD2.

The first reception sampled signal SD2' is supplied to the second reception interpolating circuit 88-1b. The second reception interpolating circuit 88-1b interpolates the first reception sampled signal SD2' at the predetermined interpolation interval and delivers a second reception interpolated signal to the second reception processing circuit 88-2b. The second reception processing circuit 88-2b is supplied with the second reception interpolated signal and the second demultiplexed transmission sampled signals TSS2' and processes the second reception interpolated signal by giving the second time difference represented by the second demultiplexed transmission sampled signals TSS2' to the second reception interpolated signal. The second reception processing circuit 88-2b delivers a second reception processed signal to the second reception sampling circuit 88-3b.

The second reception sampling circuit 88-3b samples the second reception processed signal at the picture element time interval t1 and produces a second reception sampled signal S3' as a reproduction of the third preliminary processed signal S3.

The first demultiplexed delayed signal SD1' and the first and the second reception sampled signals SD2' and S3' are supplied to the image processing unit 50 to form the stereo image.

In FIG. 13(c), the earth station may comprise a reception signal processing unit 89 in place of the reception signal processing unit 88 illustrated in FIG. 13(b). The reception signal processing unit 89 comprises a reception interpolating circuit 89-1, an adder 89-2, first and second reception processing circuits 89-3a and 89-3b, and first and second reception sampling circuits 89-4a and 89-4b. The reception interpolating circuit 89-1 carries out interpolating operation similar to that of the first reception interpolating circuit 88-1a shown in FIG. 13(b). The reception interpolating circuit 89-1 interpolates the first demultiplexed delayed signal SD1' at the predetermined interpolation interval and delivers a first reception interpolated signal to the first reception processing circuit 89-3a.

The first reception processing circuit 89-3a is supplied with the first reception interpolated signal and the first demultiplexed transmission sampled signals TSS1' and processes the first reception interpolated signal by giving the first time difference represented by the first demultiplexed transmission sampled signals TSS1' to the first reception interpolated signal. The first reception processing circuit 89-3a delivers a first reception processed signal to the first reception sampling circuit 89-4a. The first reception sampling circuit 89-4a samples the first reception processed signal at the picture element time interval t1 and produces a first reception sampled signal SD2' as a reproduction of the second delayed signal SD2.

The adder 89-2 is supplied with the first and the second demultiplexed transmission sampled signals TSS1' and TSS2' and calculates a sum of the first time difference represented by the first demultiplexed transmission sampled signal TSS1' and the second time difference represented by the second demultiplexed transmission sampled signal TSS2'. The adder 89-2 delivers a sum signal representative of the sum to the second reception processing circuit 89-3b. In addition to the sum signal, the second reception processing circuit 89-3b is supplied with the reception interpolated signal from the reception interpolating circuit 89-1. The second reception processing circuit 89-3b processes the reception interpolated signal by giving the sum represented by the sum signal to the reception interpolated signal and delivers a second reception processed signal to the second reception sampling circuit 89-4b. The second reception sampling circuit 89-4b samples the second reception processed signal at the picture element time interval t1 and produces a second reception sampled signal S3' as a reproduction of the third preliminary processed signal S3.

The first demultiplexed delayed signal SD1' and the first and the second reception sampled signals SD2' and S3' are supplied to the image processing unit 50 to form the stereo image.

Figure 14:
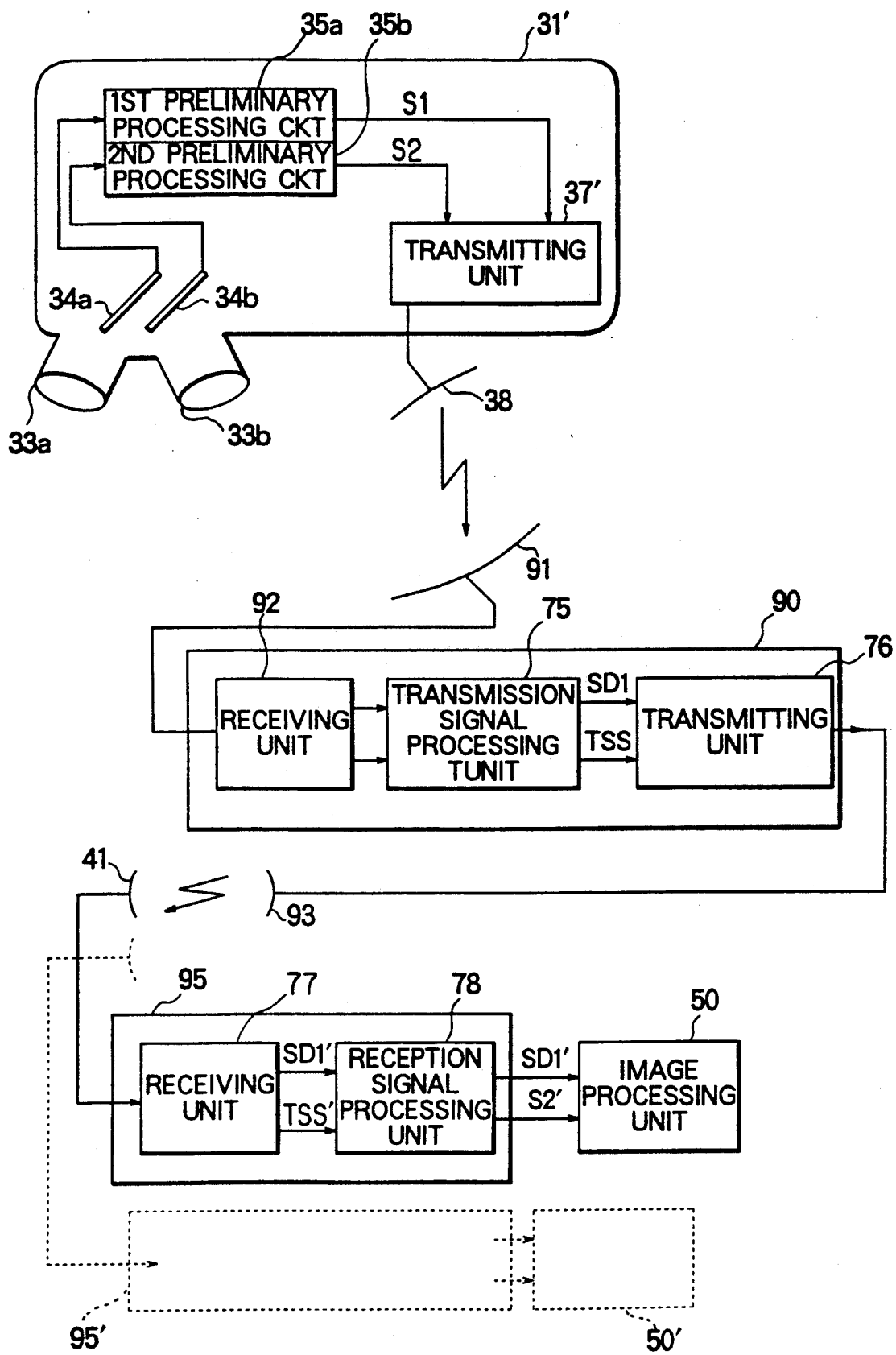
FIG. 14 is a block diagram of a craft, a repeater station, and an earth station for use in describing a modification of an image data transmission system according to the fourth embodiment of this invention.

Referring to FIG. 14, the description will proceed to a modification of the image data transmission system according to the fourth embodiment of this invention. The image data transmission system is similar to that illustrated in FIG. 9 except a repeater station 90 and an earth station 95. For the same reason mentioned in conjunction with FIG. 9, the image data transmission system is suitable for the case that the first duration T1 is a long time.

In the image data transmission system, the first and the second preliminary processed signals S1 and S2 are multiplexed into the multiplexed preliminary processed signal by the multiplexer included in the transmitting unit 37'. The multiplexed preliminary processed signal is transmitted, as the preliminary processed image data signal, from the transmitting unit 37' to the repeater station 90.

The repeater station 90 serves as a main earth station and relays between the craft 31' and a plurality of earth stations typically depicted at 95 and 95'. The earth station 95' is similar in construction to the earth station 90 and is combined with the image processing unit 50' similar to the image processing unit 50.

The repeater station 90 comprises an antenna 91 and a receiving unit 92. The receiving unit 92 receives the preliminary processed image data signal through the antenna 91 as a reception preliminary processed image data signal. The reception preliminary processed image data signal is demultiplexed into first and second demultiplexed preliminary processed signals by a demultiplexer included in the receiving unit 92. The repeater station 90 further comprises the transmission signal processing unit 75 and the transmitting unit 76 both of which are described in conjunction with FIG. 10.

In the manner described in relation to FIG. 10, the transmission signal processing unit 75 processes the first and the second demultiplexed preliminary processed signals and produces the delayed signal SD1 and the transmission sampled signal TSS. The delayed signal SD1 and the transmission sampled signal TSS are multiplexed by the multiplexer included in the transmitting unit 76 and transmitted from the transmitting unit 76 through an antenna 93 as the image data signal.

With regard to the earth station 95, the receiving unit 77 receives the image data signal through the antenna 41 a the reception image data signal. In the manner mentioned in conjunction with FIG. 10, the reception image data signal is demultiplexed into the demultiplexed delayed signal SD1' and the demultiplexed transmission sampled signal TSS' by the demultiplexer included in the receiving unit 77. The reception signal processing unit 78 processes the demultiplexed delayed signal SD1' and the demultiplexed transmission sampled signal TSS' and delivers the demultiplexed delayed signal SD1' and the reception sampled signal S2' to the image processing unit 50 to form the stereo image.

The above-mentioned modification can be applied to the fifth and the sixth embodiments described with reference to FIGS. 12 and 13.

While this invention has thus far been described in conjunction with several embodiments thereof, it will readily be possible for those skilled in the art to put this invention into practice in various other manners. For example, the first and the second optical systems illustrated in FIG. 1 may be implemented by a single optical system similar to that illustrated in FIG. 7. The first through the third photoelectric transducers 34a to 34c illustrated in FIGS. 1 and 7 may be implemented by the two-dimensional charge-coupled device similar to that illustrated in FIG. 6.

What is claimed is:

1. An image data transmission system for transmitting an image data signal from a craft to an earth station, said craft flying over an object zone in a predetermined direction and comprising an optical system for producing first and second partial optical images of first and second partial zones of said object zone, which are picked up by first and second pickup angles, respectively, said first partial zone being spaced apart from said second partial zone by a first distance forwardly of said predetermined direction, said image data transmission system comprising first and second photoelectric transducers consisting of a plurality of photoelectric transducing elements lying transversely of said predetermined direction for transducing said first and said second partial optical images to first and second partial electric signals representative of said first and said second partial zones, respectively, each of said first and said second partial electric signals comprising a succession of picture element signals which are in one-to-one correspondence to said plurality of photoelectric transducing elements and which have picture element signal levels, said craft flying for a first duration from a first position to a second position spaced apart from said first position by said first distance, said image data transmission system further comprising a transmission signal processing means which comprises:

a delay circuit supplied with said first partial electric signal for giving said first partial electric signal a first delay equal to said first duration to produce a delayed signal having said first delay relative to said first partial electric signal;

a time difference detecting circuit supplied with said second partial electric signal and connected to said delay circuit for detecting a time difference between said second partial electric signal and said delayed signal in each of said picture element signals, said time difference detecting circuit producing a time difference signal representative of said time difference;

a transmission processing circuit connected to said time difference detecting circuit for processing said delayed signal by subtracting said time difference from said delayed signal in each of said picture element signals, said transmission processing circuit producing a processed signal having a waveform approximate to that of said second partial electric signal;

a level difference detecting circuit connected to said time difference detecting circuit and said transmission processing circuit for detecting a level difference between said second partial electric signal and said processed signal in each of said picture element signals, said level difference detecting circuit producing a level difference signal representative of said level difference; and a multiplexer supplied with said delayed signal and connected to said transmission processing circuit and said level difference detecting circuit for multiplexing said delayed signal, said time difference signal, and said level difference signal into a multiplexed signal to transmit said multiplexed signal to said earth station as said image data signal.

2. An image data transmission system as claimed in claim 1, said earth station receiving said image data signal as a reception image data signal, wherein said earth station comprises:

a demultiplexer for demultiplexing said reception image data signal into a demultiplexed delayed signal as a reproduction of said delayed signal, a demultiplexed time difference signal, and a demultiplexed level difference signal;

a primary reception processing circuit connected to said demultiplexer and supplied with said demultiplexed delayed signal and said demultiplexed time difference signal for processing said demultiplexed delayed signal in accordance with said demultiplexed time difference signal to produce a primary processed signal as a reproduction of said processed signal; and a secondary reception processing circuit connected to said demultiplexer and said primary reception processing circuit for processing said primary processed signal in accordance with said demultiplexed level difference signal to produce a secondary processed signal as a reproduction of said second partial electric signal.

3. An image data transmission system as claimed in claim 1, said transmission signal processing means being in said craft and connected to said first and said second photoelectric transducers.

4. An image data transmission system as claimed in claim 1, said transmission signal processing means being in a repeater station and coupled to said first and said second photoelectric transducers through a radio channel.

5. An image data transmission system for transmitting an image data signal from a craft to an earth station, said craft flying over an object zone in a predetermined direction and comprising first and second optical systems for producing first and second partial optical images of a partial zone of said object zone, which are picked up by first and second pickup angles at the same time, respectively, said image data transmission system comprising first and second photoelectric transducers consisting of a plurality of photoelectric transducing elements lying transversely of said predetermined direction for transducing said first and said second partial optical images to first and second partial electric signals representative of said partial zone, respectively, each of said first and said second partial electric signals comprising a succession of picture element signals which are in one-to-one correspondence to said plurality of photoelectric transducing elements and which have picture element signal levels, said image data transmission system further comprising a transmission signal processing means which comprises:

a time difference detecting circuit supplied with said first and said second partial electric signals for detecting a time difference between said first and said second partial electric signals in each of said picture element signals, said time difference detecting circuit producing a time difference signal representative of said time difference;

a transmission processing circuit connected to said time difference detecting circuit for processing said first partial electric signal by subtracting said time difference from said first partial electric signal in each of said picture element signals, said transmission processing circuit producing a processed signal having a signal waveform approximate to that of said second partial electric signal;

a level difference detecting circuit connected to said time difference detecting circuit and said transmission processing circuit for detecting a level difference between said second partial electric signal and said processed signal in each of said picture element signals, said level difference detecting circuit producing a level difference signal representative of said level difference; and a multiplexer supplied with said first partial electric signal and connected to said transmission processing circuit and said level difference detecting circuit for multiplexing said first partial electric signal, said time difference signal, and said level difference signal int a multiplexed signal to transmit said multiplexed signal to said earth station as said image data signal.

6. An image data transmission system as claimed in claim 5, said earth station receiving said image data signal as a reception image data signal, wherein said earth station comprises:

a demultiplexer for demultiplexing said reception image data signal into a first demultiplexed partial electric signal as a reproduction of said first partial electric signal, a demultiplexed time difference signal, and a demultiplexed level difference signal;

a primary reception processing circuit connected to said demultiplexer and supplied with said first demultiplexed partial electric signal and said demultiplexed time difference signal for processing said first demultiplexed partial electric signal in accordance with said demultiplexed time difference signal to produce a primary processed signal as a reproduction of said processed signal; and a secondary reception processing circuit connected to said demultiplexer and said primary reception processing circuit for processing said primary processed signal in accordance with said demultiplexed level difference signal to produce a secondary processed signal as a reproduction of said second partial electric signal.

7. An image data transmission system as claimed in claim 5, said transmission signal processing means being in said craft and connected to said first and said second photoelectric transducers.

8. An image data transmission system as claimed in claim 5, said transmission signal processing means being in a repeater station and coupled to said first and said second photoelectric transducers through a radio channel.

9. An image data transmission system for transmitting an image data signal from a craft to an earth station, said craft flying over an object zone in a predetermined direction and comprising an optical system for producing first through third partial optical images of first through third partial zones of said object zone, which are picked up by first through third pickup angles, respectively, said first partial zone being spaced apart from said second and said third partial zones by first and second distances, respectively, forwardly of said predetermined direction, said first distance being shorter than said second distance, said image data transmission system comprising first through third photoelectric transducers consisting of a plurality of photoelectric transducing elements lying transversely of said predetermined direction for transducing said first through said third partial optical images to first through third partial electric signals representative of said first through said third partial zones, respectively, each of said first through said third partial electric signals comprising a succession of picture element signals which are in one-to-one correspondence to said plurality of photoelectric transducing elements and which have picture element signal levels, said craft flying for a first duration from a first position to a second position spaced apart from said first position by said first distance and flying for a second duration from said first position to a third position spaced apart from said first position by said second distance, said image data transmission system further comprising a transmission signal processing means which comprises:

a first delay circuit supplied with said first partial electric signal for giving said first partial electric signal a first delay equal to said second duration to produce a first delayed signal having said first delay relative to said first partial electric signal;

a second delay circuit supplied with said second partial electric signal for giving said second partial electric signal a second delay equal to said first duration to produce a second delayed signal having said second delay relative to said second partial electric signal;

a first time difference detecting circuit connected to said first and said second delay circuits for detecting a first time difference between said first and said second delayed signals in each of said picture element signals, said first time difference detecting circuit producing a first time difference signal representative of said first time difference;

a second time difference detecting circuit connected to said second delay circuit and supplied with said third partial electric signal for detecting a second time difference between said second delayed signal and said third partial electric signal in each of said picture element signals, said second time difference detecting circuit producing a second time difference signal representative of said second time difference;

a first transmission processing circuit connected to said first time difference detecting circuit for processing said first delayed signal by subtracting said first time difference from said first delayed signal in each of said picture element signals, said first transmission processing circuit producing a first processed signal having a signal waveform approximate to that of said second delayed signal;

a second transmission processing circuit connected to said second time difference detecting circuit for processing said second delayed signal by subtracting said second time difference from said second delayed signal in each of said picture element signals, said second transmission processing circuit producing a second processed signal having a signal waveform approximate to that of said third partial electric signal;

a first level difference detecting circuit connected to said first transmission processing circuit and said second delay circuit for detecting a first level difference between said first processed signal and said second delayed signal in each of said picture element signals, said first level difference detecting circuit producing a first level difference signal representative of said first level difference;

a second level difference detecting circuit connected to said second transmission processing circuit and said third photoelectric transducer for detecting a second level difference between said second processed signal and said third partial electric signal in each of said picture element signals, said second level difference detecting circuit producing a second level difference signal representative of said second level difference; and a multiplexer supplied with said first delayed signal and connected to said first and said second transmission processing circuits and said first and said second level difference detecting circuits for multiplexing said first delayed signal, said first and said second time difference signals, and said first and said second level difference signals into a multiplexed signal to transmit said multiplexed signal to said earth station as said image data signal.

10. An image data transmission system as claimed in claim 9, said earth station receiving said image data signal as a reception image data signal, wherein said earth station comprises:

a demultiplexer for demultiplexing said reception image data signal into a first demultiplexed delayed signal as a reproduction of said first delayed signal, first and second demultiplexed time difference signals, and first and second demultiplexed level difference signals;

a first primary reception processing circuit connected to said demultiplexer and supplied with said first demultiplexed delayed signal and said first demultiplexed time difference signal for processing said first demultiplexed delayed signal in accordance with said first demultiplexed time difference signal to produce a first primary processed signal as a reproduction of said first processed signal;

a first secondary reception processing circuit connected to said demultiplexer and said first primary reception processing circuit and supplied with said first demultiplexed level difference signal and said first primary processed signal for processing said first primary processed signal in accordance with said first demultiplexed level difference signal to produce a first secondary processed signal as a reproduction of said second delayed signal;

a second primary reception processing circuit connected to said demultiplexer and said first secondary reception processing circuit and supplied with said second demultiplexed time difference signal and said first secondary processed signal for processing said first secondary processed signal in accordance with said second demultiplexed time difference signal to produce a second primary processed signal as a reproduction of said second processed signal; and a second secondary reception processing circuit connected to said demultiplexer and said second primary reception processing circuit and supplied with said second demultiplexed level difference signal and said second primary processed signal for processing said second primary processed signal in accordance with said second demultiplexed level difference signal to produce a second secondary processed signal as a reproduction of said third partial electric signal.

11. An image data transmission system as claimed in claim 9, said transmission signal processing means being in said craft and connected to said first through said third photoelectric transducers.

12. An image data transmission system as claimed in claim 9, said transmission signal processing means being in a repeater station and coupled to said first through said third photoelectric transducers through a radio channel.

13. An image data transmission system for transmitting an image data signal from a craft to an earth station, said craft flying over an object zone in a predetermined direction and comprising an optical system for producing first and second partial optical images of first and second partial zones of said object zone, which are picked up by first and second pickup angles, respectively, said first partial zone being spaced apart from said second partial zone by a first distance forwardly of said predetermined direction, said image data transmission system including first and second photoelectric transducers consisting of a plurality of photoelectric transducing elements lying transversely of said predetermined direction for transducing said first and said second partial optical images to first and second partial electric signals representative of said first and said second partial zones, respectively, each of said first and said second partial electric signals comprising a succession of picture element signals which are in one-to-one correspondence to said plurality of photoelectric transducing elements, said craft flying for a first duration from a first position to a second position spaced apart from said first position by said first distance, said image data transmission system further comprising a transmission signal processing means which comprises:

a delay circuit supplied with said first partial electric signal for giving said first partial electric signal a first delay equal to said first duration to produce a delayed signal having said first delay relative to said first partial electric signal;

a transmission interpolating circuit connected to said delay circuit and supplied with said second partial electric signal for interpolating said delayed signal and said second partial electric signal at a predetermined interpolation interval to produce first and second transmission interpolated signals;

a time difference detecting circuit connected to said transmission interpolating circuit for detecting a time difference between said first and said second transmission interpolated signals at a predetermined detection interval equal to said predetermined interpolation interval, said time difference detecting circuit producing a time difference signal representative of said time difference;

a transmission sampling circuit connected to said time difference detecting circuit for sampling said time difference signal in synchronism with said picture element signals into a transmission sampled signal; and a multiplexer connected to said delay circuit and said transmission sampling circuit for multiplexing said delayed signal and said transmission sampled signal into a multiplexed signal to transmit said multiplexed signal to said earth station as said image data signal.

14. An image data transmission system as claimed in claim 13, said earth station receiving said image data signal as a reception image data signal, wherein said earth station comprises:

a demultiplexer for demultiplexing said reception image data signal into a demultiplexed delayed signal as a reproduction of said delayed signal and a demultiplexed transmission sampled signal, said demultiplexed delayed signal comprising a succession of reception picture element signals;

a reception interpolating circuit connected to said demultiplexer for interpolating said demultiplexed delayed signal at said predetermined interpolation interval to produce a reception interpolated signal;

a reception processing circuit connected to said demultiplexer and said reception interpolating circuit for processing said reception interpolated signal in accordance with said demultiplexed transmission sampled signal to produce a processed signal as a reproduction of said time difference signal; and a reception sampling circuit connected to said reception processing circuit for sampling said processed signal in synchronism with said reception picture element signals into a reception sampled signal as a reproduction of said second partial electric signal.

15. An image data transmission system as claimed in claim 13, said transmission signal processing means being in said craft and connected to said first and said second photoelectric transducers.

16. An image data transmission system as claimed in claim 13, said transmission signal processing means being in a repeater station and coupled to said first and said second photoelectric transducers through a radio channel.

17. An image data transmission system for transmitting an image data signal from a craft to an earth station, said craft flying over an object zone in a predetermined direction and comprising first and second optical systems for producing first and second partial optical images of a partial zone of said object zone, which are picked up by first and second pickup angles, respectively, at the same time, said image data transmission system including first and second photoelectric transducers consisting of a plurality of photoelectric transducing elements lying transversely of said predetermined direction for transducing said first and said second partial optical image to first and second partial electric signals representative of said partial zone, respectively, each of said first and said second partial electric signals comprising a succession of picture element signals which are in one-to-one correspondence to said plurality of photoelectric transducing elements, said image data transmission system further comprising a transmission signal processing means which comprises:

a transmission interpolating circuit supplied with said first and said second partial electric signals for interpolating said first and said second partial electric signals at a predetermined interpolation interval to produce first and second transmission interpolated signals;

a time difference detecting circuit connected to said transmission interpolating circuit for detecting a time difference between said first and said second transmission interpolated signals at a predetermined detection interval equal to said predetermined interpolation interval, said time difference detecting circuit producing a time difference signal representative of said time difference;

a transmission sampling circuit connected to said time difference detecting circuit for sampling said time difference signal in synchronism with said picture element signals into a transmission sampled signal; and a multiplexer supplied with said first partial electric signal and connected to said transmission sampling circuit for multiplexing said first partial electric signal and said transmission sampled signal into a multiplexed signal to transmit said multiplexed signal to said earth station as said image data signal.

18. An image data transmission system as claimed in claim 17, said earth station receiving said image data signal as a reception image data signal, wherein said earth station comprises:

a demultiplexer for demultiplexing said reception image data signal into a first demultiplexed partial electric signal as a reproduction of said first partial electric signal and a demultiplexed transmission sampled signal, said first demultiplexed partial electric signal comprising a succession of reception picture element signals;

a reception interpolating circuit connected to said demultiplexer for interpolating said first demultiplexed partial electric signal at said predetermined interpolation interval to produce a reception interpolated signal;

a processing circuit connected to said demultiplexer and said reception interpolating circuit for processing said reception interpolated signal in accordance with said demultiplexed transmission sampled signal to produce a processed signal as a reproduction of said time difference signal; and a reception sampling circuit connected to said processing circuit for sampling said processed signal in synchronism with said reception picture element signals into a reception sampled signal as a reproduction of said second partial electric signal.

19. An image data transmission system as claimed in claim 17, said transmission signal processing means being in said craft and connected to said first and said second photoelectric transducers.

20. An image data transmission system as claimed in claim 17, said transmission signal processing means being in a repeater station and coupled to said first and said second photoelectric transducers through a radio channel.

21. An image data transmission system for transmitting an image data signal from a craft to an earth station, said craft flying over an object zone in a predetermined direction and comprising an optical system for producing first through third partial optical images of first through third partial zones of said object zone, which are picked up by first through third pickup angles, respectively, said first partial zone being spaced apart from said second and said third partial zones by first and second distances forwardly of said predetermined direction, respectively, said first distance being shorter than said second distance, said image data transmission system including first through third photoelectric transducers consisting of a plurality of photoelectric transducing elements lying transversely of said predetermined direction for transducing said first through said third partial optical images to first through third partial electric signals representative of said first through said third partial zones, respectively, each of said first through said third partial electric signals comprising a succession of picture element signals which are in one-to-one correspondence to said plurality of photoelectric transducing elements and which have picture element signal levels, said craft flying for a first duration from a first position to a second position spaced apart from said first position by said first distance and flying for a second duration from said first position to a third position spaced apart from said first position by said second distance, said image data transmission system further comprising a transmission signal processing means which comprises:

a first delay circuit supplied with said first partial electric signal for giving said first partial electric signal a first delay equal to said second duration to produce a first delayed signal having said first delay relative to said first partial electric signal;

a second delay circuit supplied with said second partial electric signal for giving said second partial electric signal a second delay equal to said first duration to produce a second delayed signal having said second delay relative to said second partial electric signal;

a transmission interpolating circuit connected to said first and said second delay circuits and supplied with third partial electric signal for interpolating said first and said second delayed signals and said third partial electric signal at a predetermined interpolation interval to produce first through third transmission interpolated signals;

a first time difference detecting circuit connected to said transmission interpolating circuit for detecting a first time difference between said first and said second transmission interpolated signals at a predetermined detection interval equal to said predetermined interpolation interval, said first time difference detecting circuit producing a first time difference signal representative of said first time difference;

a second time difference detecting circuit connected to said transmission interpolating circuit for detecting a second time difference between said second and said third transmission interpolated signals at said predetermined detection interval, said second time difference detecting circuit producing a second time difference signal representative of said second time difference;

a first transmission sampling circuit connected to said first time difference detecting circuit for sampling said first time difference signal in synchronism with said picture element signals into a first transmission sampled signal representative of a first sampled time difference;

a second transmission sampling circuit connected to said second time difference detecting circuit for sampling said second time difference signal in synchronism with said picture element signals into a second transmission sampled signal representative of a second sampled time difference; and a multiplexer connected to said first delay circuit and said first and said second transmission sampling circuits for multiplexing said first delayed signal and said first and said second transmission sampled signals into a multiplexed signal to transmit said multiplexed signal to said earth station as said image data signal.

22. An image data transmission system as claimed in claim 21, said earth station receiving said image data signal as a reception image data signal, wherein said earth station comprises:

a demultiplexer for demultiplexing said reception image data signal into a first demultiplexed delayed signal as a reproduction of said first delayed signal, first and second demultiplexed transmission sampled signals, said first demultiplexed delayed signal comprising a succession of reception picture element signals;

a first reception interpolating circuit connected to said demultiplexer for interpolating said first demultiplexed delayed signal at said predetermined interpolation interval to produce a first reception interpolated signal;

a first processing circuit connected to said demultiplexer and said first reception interpolating circuit for processing said first reception interpolated signal in accordance with said first demultiplexed transmission sampled signal to produce a first processed signal as a reproduction of said first time difference signal;

a first reception sampling circuit connected to said first processing circuit for sampling said first processed signal in synchronism with said reception picture element signals into a first reception sampled signal as a reproduction of said second delayed signal;

a second reception interpolating circuit connected to said demultiplexer and said first reception sampling circuit for interpolating said first reception sampled signal at said predetermined interpolation interval to produce a second reception interpolated signal;

a second processing circuit connected to said demultiplexer and said second reception interpolating circuit for processing said second reception interpolated signal in accordance with said second demultiplexed transmission sampled signal to produce a second processed signal as a reproduction of said second time difference signal; and a second reception sampling circuit connected to said second processing circuit for sampling said second processed signal in synchronism with said reception picture element signals into a second reception sampled signal as a reproduction of said third partial electric signal.

23. An image data transmission system as claimed in claim 21, said earth station receiving said image data signal as a reception image data signal, wherein said earth station comprises:

a demultiplexer for demultiplexing said reception image data signal into a first demultiplexed delayed signal as a reproduction of said first delayed signal, first and second demultiplexed transmission sampled signals, said first demultiplexed delayed signal comprising a succession of reception picture element signals;

a first reception interpolating circuit connected to said demultiplexer for interpolating said first demultiplexed delayed signal at said predetermined interpolation interval to produce a first reception interpolated signal;

a first processing circuit connected to said demultiplexer and said first reception interpolating circuit for processing said first reception interpolated signal in accordance with said first demultiplexed transmission sampled signal to produce a first processed signal;

a first reception sampling circuit connected to said first processing circuit for sampling said first processed signal in synchronism with said reception picture element signals into a first reception sampled signal as a reproduction of said second delayed signal;

an adder connected to said demultiplexer and supplied with said first and said second demultiplexed transmission sampled signals for calculating a sum of said first and said second sampled time differences to produce a sum signal representative of said sum;

a second processing circuit connected to said first reception interpolating circuit and said adder for processing said first reception interpolated signal in accordance with said sum signal to produce a second processed signal; and a second reception sampling circuit connected to said second processing circuit for sampling said second processed signal in synchronism with said reception picture element signals into a second reception sampled signal as a reproduction of said third partial electric signal.

24. An image data transmission system as claimed in claim 21, said transmission signal processing means being in said craft and connected to said first through said third photoelectric transducers.

25. An image data transmission system as claimed in claim 21, said transmission signal processing means being in a repeater station and coupled to said first through said third photoelectric transducers through a radio channel.

* * * * *